United States Patent
Yuan et al.

(10) Patent No.: US 10,542,519 B2
(45) Date of Patent: Jan. 21, 2020

(54) TERMINAL POSITIONING METHOD AND NETWORK DEVICE

(71) Applicant: Huawei Technologies Co., Ltd., Shenzhen (CN)

(72) Inventors: Mingxuan Yuan, Hong Kong (HK); Jia Zeng, Hong Kong (HK); Xialiang Tong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/136,827

(22) Filed: Sep. 20, 2018

(65) Prior Publication Data

US 2019/0021068 A1 Jan. 17, 2019

Related U.S. Application Data

(63) Continuation of application No. PCT/CN2016/102043, filed on Oct. 13, 2016.

(30) Foreign Application Priority Data

Apr. 29, 2016 (CN) .......................... 2016 1 0289359

(51) Int. Cl.
*H04W 4/00* (2018.01)
*H04W 64/00* (2009.01)
(Continued)

(52) U.S. Cl.
CPC ......... *H04W 64/003* (2013.01); *G01S 5/0252* (2013.01); *G06N 5/042* (2013.01); *G06N 20/00* (2019.01); *H04W 4/021* (2013.01)

(58) Field of Classification Search
CPC ..... H04W 4/029; H04W 64/00; H04W 4/023; H04W 4/021
See application file for complete search history.

(56) References Cited

U.S. PATENT DOCUMENTS

| 5,043,736 A | 8/1991 | Darnell et al. |
| 5,293,645 A | 3/1994 | Sood |

(Continued)

FOREIGN PATENT DOCUMENTS

| CN | 101986757 A | 3/2011 |
| CN | 102111871 A | 6/2011 |

(Continued)

OTHER PUBLICATIONS

Anagnostopoulos, T., et al., "Predicting the Location of Mobile Users : A Machine Learning Approach," XP055591302, Proceedings of the 2009 International Conference on Pervasive Services, Jan. 1, 2009, pp. 65-72.

(Continued)

*Primary Examiner* — Omoniyi Obayanju
(74) *Attorney, Agent, or Firm* — Conley Rose, P.C.

(57) ABSTRACT

A terminal positioning method and a network device, where the network device obtains radio signal sampling information of a first terminal at a current moment. The first terminal is any terminal in a target region, and the target region is a preset geographic region. The network device obtains position information of the first terminal at the current moment by prediction based on the radio signal sampling information of the first terminal at the current moment and a predictive model of the target region. The predictive model is obtained by extensive data training in the target region, has relatively strong error tolerance and error-correction capabilities, and can accurately reflect a relationship between radio signal sampling information and position information of a terminal. Terminal positioning accuracy is effectively improved.

20 Claims, 7 Drawing Sheets

(51) Int. Cl.
*G06N 20/00* (2019.01)
*G01S 5/02* (2010.01)
*G06N 5/04* (2006.01)
*H04W 4/021* (2018.01)

(56) References Cited

U.S. PATENT DOCUMENTS

| | | | |
|---|---|---|---|
| 5,895,436 | A | 4/1999 | Savoie et al. |
| 5,913,170 | A | 6/1999 | Wortham |
| 7,920,873 | B2 | 4/2011 | Tang-Taye |
| 8,238,915 | B2 | 8/2012 | Hazzani |
| 8,971,924 | B2 | 3/2015 | Pai et al. |
| 2005/0024202 | A1 | 2/2005 | Culpepper et al. |
| 2006/0128401 | A1 | 6/2006 | Hayashi et al. |
| 2014/0011471 | A1 | 1/2014 | Khosla et al. |
| 2014/0141815 | A1 | 5/2014 | Rhoads et al. |
| 2014/0274022 | A1* | 9/2014 | Bell ............... G06F 16/21 455/418 |
| 2014/0287772 | A1 | 9/2014 | Saunders et al. |
| 2014/0335896 | A1 | 11/2014 | Muhonen et al. |
| 2015/0181549 | A1 | 6/2015 | Batada et al. |
| 2015/0304985 | A1 | 10/2015 | Luo |
| 2016/0021503 | A1 | 1/2016 | Tapia |
| 2016/0154103 | A1* | 6/2016 | Moriuchi ............... G01S 13/931 342/70 |

FOREIGN PATENT DOCUMENTS

| | | |
|---|---|---|
| CN | 103906233 A | 7/2014 |
| CN | 104080163 A | 10/2014 |
| CN | 104469676 A | 3/2015 |
| CN | 104968045 A | 10/2015 |
| CN | 105282758 A | 1/2016 |
| CN | 105338489 A | 2/2016 |
| WO | 9626614 A1 | 8/1996 |
| WO | 2005012936 A3 | 2/2005 |
| WO | 2011058499 A1 | 5/2011 |
| WO | 2011097414 A1 | 8/2011 |

OTHER PUBLICATIONS

Foreign Communication From a Counterpart Application, European Application No. 16900172.4, Extended European Search Report dated Jun. 4, 2019, 10 pages.
Machine Translation and Abstract of Chinese Publication No. CN101986757, Mar. 16, 2011, 14 pages.
Machine Translation and Abstract of Chinese Publication No. CN102111871, Jun. 29, 2011, 20 pages.
Machine Translation and Abstract of Chinese Publication No. CN104469676, Mar. 25, 2015, 21 pages.
Foreign Communication From a Counterpart Application, PCT Application No. PCT/CN2016/102043, English Translation of International Search Report dated Dec. 29, 2016, 2 pages.
Foreign Communication From a Counterpart Application, PCT Application No. PCT/CN2016/102043, English Translation of Written Opinion dated Dec. 29, 2016, 4 pages.
Machine Translation and Abstract of Chinese Publication No. CN103906233, Jul. 2, 2014, 23 pages.
Machine Translation and Abstract of Chinese Publication No. CN104080163, Oct. 1, 2014, 44 pages.
Machine Translation and Abstract of Chinese Publication No. CN104968045, Oct. 7, 2015, 20 pages.
Machine Translation and Abstract of Chinese Publication No. CN105282758, Jan. 27, 2016, 13 pages.
Machine Translation and Abstract of Chinese Publication No. CN105338489, Feb. 17, 2016, 17 pages.
Foreign Communication From a Counterpart Application, Chinese Application No. 201710697232.0, Chinese Office Action dated Apr. 29, 2019, 6 pages.
Foreign Communication From a Counterpart Application, Chinese Application No. 201710697232.0, Chinese Search Report dated Apr. 19, 2019, 2 pages.

* cited by examiner

FIG. 4

- Building
- First-type position information of a terminal
- Predicted moving track

TERMINAL POSITIONING METHOD AND NETWORK DEVICE

CROSS-REFERENCE TO RELATED APPLICATIONS

This application is a continuation of International Patent Application No. PCT/CN2016/102043 filed on Oct. 13, 2016, which claims priority to Chinese Patent Application No. 201610289359.4 filed on Apr. 29, 2016. The disclosures of the aforementioned applications are hereby incorporated by reference in their entireties.

TECHNICAL FIELD

This application relates to the field of communications technologies, and in particular, to a terminal positioning method and a network device.

BACKGROUND

As mobile devices and the mobile Internet are popularized, a terminal positioning technology gradually develops. Currently, a common terminal positioning method is a range-based positioning method. The range-based method is a method for determining an actual position of a mobile terminal by calculating a distance between the terminal and a base station connected to the terminal and using a triangle positioning technology. In a triangle positioning method, a distance between a terminal and a base station is estimated using radio signal strength (RSS) of three base stations received by the terminal, one coverage arc is drawn using the distance as a radius, and a crosspoint of three coverage arcs is a position of the terminal. A core step in the method is to calculate the distance between the terminal and the base station connected to the terminal. Further, the distance between the terminal and the base station may be estimated using observed RSS and radio signal attenuation in propagation (a signal attenuation model in an ideal surface propagation case). However, because the RSS is usually interfered with due to multipath attenuation, non-line-of-sight blockage, and the like, during triangle positioning, positioning precision is low and a large error exists. In addition, based on statistics about an actual record, most terminals are connected only to less than three base stations. As shown in Table 1, Table 1 shows percentages of quantities of base stations connected to a terminal in a measurement report (MR) of an operator in one day and three days.

TABLE 1

Percentage of a quantity of base stations connected to a terminal

| | Quantity of included base stations | | | | | |
|---|---|---|---|---|---|---|
| | 1 | 2 | 3 | 4 | 5 | 6 |
| Percentage in one day | 38% | 18% | 14% | 10% | 7% | 13% |
| Percentage in three days | 38% | 18% | 15% | 10% | 7% | 12% |

It can be learned by analyzing Table 1 that most terminals are connected to only one or two base stations. Consequently, terminal positioning performed using an algorithm such as a triangle positioning algorithm is inaccurate.

Based on the above, in an existing positioning method, positioning precision is low and an error is large because a radio signal is interfered with when terminal positioning is performed by calculating a distance between a terminal and a base station. Therefore, currently, a more effective terminal positioning method is urgently required to improve positioning accuracy and reduce a positioning error.

SUMMARY

This application provides a terminal positioning method and a network device in order to resolve a technical problem that with a positioning method, positioning precision is low and a large error exists.

This application provides a terminal positioning method, including obtaining, by a network device, radio signal sampling information of a first terminal at a current moment, where the first terminal is any terminal in a target region, and the target region is a preset geographic region, and obtaining, by the network device, position information of the first terminal at the current moment by means of prediction based on the radio signal sampling information of the first terminal at the current moment and a predictive model of the target region, where the predictive model is determined based on a plurality of data pairs of at least two historical terminals in the target region, each of the plurality of data pairs includes radio signal sampling information and position information, and the radio signal sampling information and the position information in the data pair are radio signal sampling information and position information of a same historical terminal at a same historical moment.

Therefore, the predictive model is determined based on the plurality of data pairs of the at least two historical terminals in the target region, and both radio signal sampling information and position information included in the plurality of data pairs are information that can be directly obtained in the other approaches without a need of additional collection such that positioning costs can be effectively reduced. In addition, the predictive model is obtained by means of extensive data training in the target region, has relatively strong error tolerance and error-correction capabilities, and can accurately reflect a relationship between radio signal sampling information and position information of a terminal such that a problem of positioning is inaccurate because RSS is interfered with due to multipath attenuation, non-line-of-sight blockage, and the like, and because a quantity of base stations connected to the terminal is insufficient is well avoided. Therefore, positioning is performed based on the predictive model and the radio signal sampling information of the terminal in the present disclosure such that terminal positioning accuracy can be effectively improved, and a positioning error can be reduced. This application has a high practical value.

Optionally, the predictive model is determined by the network device in the following manner of obtaining, by the network device by means of screening from radio signal sampling information in the plurality of data pairs, a specified radio signal feature whose relevance to a position feature in position information in the plurality of data pairs is greater than or equal to a first threshold, and establishing, by the network device, a function relationship between the specified radio signal feature and the position feature to obtain the predictive model.

Therefore, by training the plurality of data pairs, the network device obtains the specified radio signal feature by means of screening, and establishes the function relationship between the specified radio signal feature and the position feature such that the built predictive model is simpler and more accurate.

Optionally, obtaining, by the network device, position information of the first terminal at the current moment by means of prediction based on the radio signal sampling information of the first terminal at the current moment and a predictive model of the target region includes obtaining, by the network device based on at least radio signal sampling information of the to-be-positioned terminal at the current moment, a value corresponding to the specified radio signal feature, and performing, by the network device, calculation based on the predictive model and the value corresponding to the specified radio signal feature, to obtain the position information of the first terminal at the current moment.

Therefore, the network device needs to obtain only the value corresponding to the specified radio signal feature such that the network device can obtain the position information of the first terminal at the current moment based on the predictive model without a need of obtaining additional information, thereby reducing positioning costs and implementing fast positioning.

Optionally, the specified radio signal feature includes any one or any combination of a first-type signal feature, a second-type signal feature, or a third-type signal feature.

A value corresponding to the first-type signal feature is extracted from the radio signal sampling information of the to-be-positioned terminal at the current moment.

A value corresponding to the second-type signal feature is calculated based on a value corresponding to one or more first-type signal features.

A value corresponding to the third-type signal feature is obtained using initial position information of the to-be-positioned terminal at the current moment and initial position information of the to-be-positioned terminal at an adjacent moment of the current moment, and the initial position information of the to-be-positioned terminal at the current moment or the initial position information of the to-be-positioned terminal at the adjacent moment of the current moment is obtained by calculating, using the function relationship, a value corresponding to one or more first-type signal features and/or a value corresponding to one or more second-type signal features at the moment.

Therefore, the specified radio signal feature may include the foregoing three types such that the specified radio signal feature used for positioning is relatively comprehensive, and various radio signal features that may affect the position information of the terminal are fully considered, thereby ensuring positioning precision and positioning accuracy.

Optionally, a plurality of data pairs of any one of the at least two historical terminals are obtained based on the following method. For a first historical terminal, obtaining, by the network device, radio signal sampling information of the first historical terminal at a plurality of first historical moments and position information of the first historical terminal at a plurality of second historical moments, where the first historical terminal is any one of the at least two historical terminals, and obtaining, by the network device, a plurality of data pairs of the first historical terminal based on the radio signal sampling information of the first historical terminal at the plurality of first historical moments and the position information of the first historical terminal at the plurality of second historical moments.

Optionally, obtaining, by the network device, a plurality of data pairs of the first historical terminal based on the radio signal sampling information of the first historical terminal at the plurality of first historical moments and the position information of the first historical terminal at the plurality of second historical moments includes determining, by the network device, a clock correspondence between the plurality of first historical moments of the first historical terminal and the plurality of second historical moments of the first historical terminal according to a first preset rule, where the first preset rule is any one of a plurality of preset rules, calculating, by the network device for the first preset rule, a sum of distances between a base station to which the first historical terminal belongs and the first historical terminal at the plurality of first historical moments, where a distance between the base station to which the first historical terminal belongs and the first historical terminal at each of the plurality of first historical moments is obtained using the following method of determining, by the network device based on the clock correspondence, a second historical moment corresponding to the first historical moment, determining the distance between the base station and the first historical terminal at the first historical moment based on position information of the base station in radio signal sampling information at the first historical moment and position information of the first historical terminal at the second historical moment corresponding to the first historical moment, and determining, by the network device, the plurality of data pairs of the first historical terminal based on a target clock correspondence, where the target clock correspondence is a clock correspondence in which the sum of distances between the base station to which the first historical terminal belongs and the first historical terminal at the plurality of first historical moments is minimum in the plurality of preset rules.

Therefore, a problem of clock asynchronization between collected radio signal sampling information and collected position information is fully considered. A time offset between a clock on which the radio signal sampling information of the first historical terminal is based and a clock on which the position information of the first historical terminal is based is determined based on the plurality of preset rules, to obtain the target clock correspondence such that the plurality of data pairs are determined based on the target clock correspondence. Data used for predictive model training is processed in such a manner such that data on which predictive model building is based is more accurate, and the built predictive model more accords with an actual situation.

Optionally, the radio signal sampling information of the first historical terminal at the plurality of first historical moments is obtained based on first frequency, the position information of the first historical terminal at the plurality of second historical moments is obtained based on second frequency, and the first frequency is less than the second frequency.

A manner of determining, by the network device, the plurality of data pairs of the first historical terminal based on a target clock correspondence includes separately using, by the network device, the radio signal sampling information of the first historical terminal at the plurality of first historical moments as radio signal sampling information in the plurality of data pairs, and obtaining, by the network device based on the target clock correspondence, the plurality of second historical moments corresponding to the plurality of first historical moments, and obtaining position information in the plurality of data pairs of the first historical terminal based on at least the position information at the plurality of second historical moments corresponding to the plurality of first historical moments.

Therefore, a sampling frequency difference between the radio signal sampling information and the position information is fully considered, and the location information in the data pair is obtained based on at least the position information at the second historical moment corresponding to the first historical moment. For example, the position information in the data pair may be obtained based on an average of position information in a preset time period of the second historical moment corresponding to the first historical moment. Therefore, the position information in the data pair is more accurate.

Optionally, the position information of the first historical terminal at the plurality of second historical moments includes first-type position information and/or second-type position information.

The first-type position information is position information that is obtained by parsing data collected by the network device through a Gn interface.

The second-type position information is position information that is obtained after the network device determines a moving track of the first historical terminal based on the first-type position information and map information of the target region, and performs interpolation in any two pieces of adjacent first-type position information based on the moving track.

Therefore, a problem that the first-type position information may have relatively low sampling frequency is considered. The moving track is fully used, and the second-type position information is obtained by means of interpolation such that the position information is more dense, thereby ensuring that all radio signal sampling information of the first historical moment has corresponding position information, and making full use of the radio signal sampling information.

This application provides a network device, and the network device includes an obtaining module configured to obtain radio signal sampling information of a first terminal at a current moment, where the first terminal is any terminal in a target region, and the target region is a preset geographic region, and a processing module configured to obtain position information of the first terminal at the current moment by means of prediction based on the radio signal sampling information of the first terminal at the current moment and a predictive model of the target region, where the predictive model is determined based on a plurality of data pairs of at least two historical terminals in the target region, each of the plurality of data pairs includes radio signal sampling information and position information, and the radio signal sampling information and the position information in the data pair are radio signal sampling information and position information of a same historical terminal at a same historical moment.

Optionally, the processing module is further configured to obtain, by means of screening from radio signal sampling information in the plurality of data pairs, a specified radio signal feature whose relevance to a position feature in position information in the plurality of data pairs is greater than or equal to a first threshold, and establish a function relationship between the specified radio signal feature and the position feature to obtain the predictive model.

Optionally, the processing module is further configured to obtain, based on at least radio signal sampling information of the to-be-positioned terminal at the current moment, a value corresponding to the specified radio signal feature, and perform calculation based on the predictive model and the value corresponding to the specified radio signal feature, to obtain position information of the to-be-positioned terminal at the current moment.

Optionally, the specified radio signal feature includes any one or any combination of a first-type signal feature, a second-type signal feature, or a third-type signal feature.

A value corresponding to the first-type signal feature is extracted from the radio signal sampling information of the to-be-positioned terminal at the current moment.

A value corresponding to the second-type signal feature is calculated based on a value corresponding to one or more first-type signal features.

A value corresponding to the third-type signal feature is obtained using initial position information of the to-be-positioned terminal at the current moment and initial position information of the to-be-positioned terminal at an adjacent moment of the current moment, and the initial position information of the to-be-positioned terminal at the current moment or the initial position information of the to-be-positioned terminal at the adjacent moment of the current moment is obtained by calculating, using the function relationship, a value corresponding to one or more first-type signal features and/or a value corresponding to one or more second-type signal features at the moment.

Optionally, the processing module is further configured to obtain a plurality of data pairs of any one of the at least two historical terminals based on the following method for a first historical terminal, obtaining radio signal sampling information of the first historical terminal at a plurality of first historical moments and position information of the first historical terminal at a plurality of second historical moments, where the first historical terminal is any one of the at least two historical terminals, and obtaining a plurality of data pairs of the first historical terminal based on the radio signal sampling information of the first historical terminal at the plurality of first historical moments and the position information of the first historical terminal at the plurality of second historical moments.

Optionally, the processing module is further configured to determine a clock correspondence between the plurality of first historical moments of the first historical terminal and the plurality of second historical moments of the first historical terminal according to a first preset rule, where the first preset rule is any one of a plurality of preset rules, calculate, for the first preset rule, a sum of distances between a base station to which the first historical terminal belongs and the first historical terminal at the plurality of first historical moments, where a distance between the base station to which the first historical terminal belongs and the first historical terminal at each of the plurality of first historical moments is obtained using the following method of determining, by the network device based on the clock correspondence, a second historical moment corresponding to the first historical moment, and determining the distance between the base station and the first historical terminal at the first historical moment based on position information of the base station in radio signal sampling information at the first historical moment and position information of the first historical terminal at the second historical moment corresponding to the first historical moment, and determine the plurality of data pairs of the first historical terminal based on a target clock correspondence, where the target clock correspondence is a clock correspondence in which the sum of distances between the base station to which the first historical terminal belongs and the first historical terminal at the plurality of first historical moments is minimum in the plurality of preset rules.

Optionally, the radio signal sampling information of the first historical terminal at the plurality of first historical moments is obtained based on first frequency, the position information of the first historical terminal at the plurality of second historical moments is obtained based on second frequency, and the first frequency is less than the second frequency.

The processing module is further configured to separately use the radio signal sampling information of the first historical terminal at the plurality of first historical moments as radio signal sampling information in the plurality of data pairs, and obtain, based on the target clock correspondence, the plurality of second historical moments corresponding to the plurality of first historical moments, and obtain position information in the plurality of data pairs of the first historical terminal based on at least the position information at the plurality of second historical moments corresponding to the plurality of first historical moments.

Optionally, the position information of the first historical terminal at the plurality of second historical moments includes first-type position information and/or second-type position information.

The first-type position information is position information that is obtained by parsing data collected by the network device through a Gn interface.

The second-type position information is position information that is obtained after the network device determines a moving track of the first historical terminal based on the first-type position information and map information of the target region, and performs interpolation in any two pieces of adjacent first-type position information based on the moving track.

This application provides another network device, and the network device includes a memory configured to store obtained radio signal sampling information of a first terminal at a current moment and an obtained predictive model of a target region, where the first terminal is any terminal in the target region, the target region is a preset geographic region, the predictive model is determined based on a plurality of data pairs of at least two historical terminals in the target region, each of the plurality of data pairs includes radio signal sampling information and position information, and the radio signal sampling information and the position information in the data pair are radio signal sampling information and position information of a same historical terminal at a same historical moment, and a processor configured to obtain position information of the first terminal at the current moment by means of prediction based on the radio signal sampling information of the first terminal at the current moment and the predictive model of the target region.

Optionally, the processor is further configured to obtain, by means of screening from radio signal sampling information in the plurality of data pairs, a specified radio signal feature whose relevance to a position feature in position information in the plurality of data pairs is greater than or equal to a first threshold, and establish a function relationship between the specified radio signal feature and the position feature, to obtain the predictive model.

Optionally, the processor is further configured to obtain, based on at least radio signal sampling information of the to-be-positioned terminal at the current moment, a value corresponding to the specified radio signal feature, and perform calculation based on the predictive model and the value corresponding to the specified radio signal feature, to obtain position information of the to-be-positioned terminal at the current moment.

Optionally, the specified radio signal feature includes any one or any combination of a first-type signal feature, a second-type signal feature, or a third-type signal feature.

A value corresponding to the first-type signal feature is extracted from the radio signal sampling information of the to-be-positioned terminal at the current moment.

A value corresponding to the second-type signal feature is calculated based on a value corresponding to one or more first-type signal features.

A value corresponding to the third-type signal feature is obtained using initial position information of the to-be-positioned terminal at the current moment and initial position information of the to-be-positioned terminal at an adjacent moment of the current moment, and the initial position information of the to-be-positioned terminal at the current moment or the initial position information of the to-be-positioned terminal at the adjacent moment of the current moment is obtained by calculating, using the function relationship, a value corresponding to one or more first-type signal features and/or a value corresponding to one or more second-type signal features at the moment.

Optionally, the processor is further configured to obtain a plurality of data pairs of any one of the at least two historical terminals based on the following method for a first historical terminal, obtaining radio signal sampling information of the first historical terminal at a plurality of first historical moments and position information of the first historical terminal at a plurality of second historical moments, where the first historical terminal is any one of the at least two historical terminals, and obtaining a plurality of data pairs of the first historical terminal based on the radio signal sampling information of the first historical terminal at the plurality of first historical moments and the position information of the first historical terminal at the plurality of second historical moments.

Optionally, the processor is further configured to determine a clock correspondence between the plurality of first historical moments of the first historical terminal and the plurality of second historical moments of the first historical terminal according to a first preset rule, where the first preset rule is any one of a plurality of preset rules, calculate, for the first preset rule, a sum of distances between a base station to which the first historical terminal belongs and the first historical terminal at the plurality of first historical moments, where a distance between the base station to which the first historical terminal belongs and the first historical terminal at each of the plurality of first historical moments is obtained using the following method of determining, by the network device based on the clock correspondence, a second historical moment corresponding to the first historical moment, and determining the distance between the base station and the first historical terminal at the first historical moment based on position information of the base station in radio signal sampling information at the first historical moment and position information of the first historical terminal at the second historical moment corresponding to the first historical moment, and determine the plurality of data pairs of the first historical terminal based on a target clock correspondence, where the target clock correspondence is a clock correspondence in which the sum of distances between the base station to which the first historical terminal belongs and the first historical terminal at the plurality of first historical moments is minimum in the plurality of preset rules.

Optionally, the radio signal sampling information of the first historical terminal at the plurality of first historical moments is obtained based on first frequency, the position information of the first historical terminal at the plurality of second historical moments is obtained based on second frequency, and the first frequency is less than the second frequency.

The processor is further configured to separately use the radio signal sampling information of the first historical terminal at the plurality of first historical moments as radio signal sampling information in the plurality of data pairs, and obtain, based on the target clock correspondence, the plurality of second historical moments corresponding to the plurality of first historical moments, and obtain position information in the plurality of data pairs of the first historical terminal based on at least the position information at the plurality of second historical moments corresponding to the plurality of first historical moments.

Optionally, the position information of the first historical terminal at the plurality of second historical moments includes first-type position information and/or second-type position information.

The first-type position information is position information that is obtained by parsing data collected by the network device through a Gn interface.

The second-type position information is position information that is obtained after the network device determines a moving track of the first historical terminal based on the first-type position information and map information of the target region, and performs interpolation in any two pieces of adjacent first-type position information based on the moving track.

In the foregoing embodiments of the present disclosure, the network device obtains the radio signal sampling information of the first terminal at the current moment. The first terminal is any terminal in the target region, and the target region is the preset geographic region. The network device obtains the position information of the first terminal at the current moment by means of prediction based on the radio signal sampling information of the first terminal at the current moment and the predictive model of the target region. In this application, the predictive model is determined based on the plurality of data pairs of the at least two historical terminals in the target region, and each of the plurality of data pairs includes the radio signal sampling information and the position information. Both the radio signal sampling information and the position information are information that can be directly obtained in the other approaches without a need of additional collection such that positioning costs can be effectively reduced. In addition, the predictive model is obtained by means of extensive data training in the target region, has relatively strong error tolerance and error-correction capabilities, and can accurately reflect a relationship between radio signal sampling information and position information of a terminal such that a problem of positioning is inaccurate because RSS is interfered with due to multipath attenuation, non-line-of-sight blockage, and the like, and because a quantity of base stations connected to the terminal is insufficient is well avoided. Therefore, positioning is performed based on the predictive model and the radio signal sampling information of the terminal in the present disclosure such that terminal positioning accuracy can be effectively improved, and a positioning error can be reduced. This application has a high practical value.

BRIEF DESCRIPTION OF DRAWINGS

To describe the technical solutions in this application more clearly, the following briefly describes the accompanying drawings describing the embodiments.

FIG. 4 is an example diagram of a uniform resource locator (URL) including position information;

DESCRIPTION OF EMBODIMENTS

To make the objectives, technical solutions, and advantages of the present disclosure clearer, the following further describes the present disclosure in detail with reference to the accompanying drawings.

A terminal in this application may be a device that can support telecommunication connection, for example, a handheld device, an in-vehicle device, a wearable device, a computing device, user equipment (UE) in various forms, a mobile station (MS), a terminal, or terminal equipment. Further, the terminal may be a mobile phone, a tablet computer, a portable computer, a desktop computer, or the like. For ease of description, these devices are simply referred to as a terminal in this application.

Figure 1:
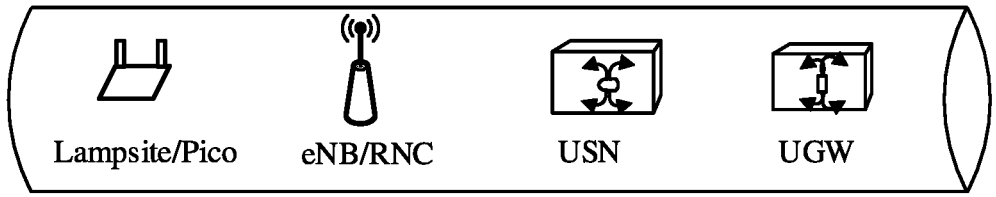
FIG. 1 is a schematic diagram of telecommunication pipeline data of a terminal.

Telecommunication pipeline data of a terminal records all information about the terminal, such as connection, communication, and measurement. FIG. 1 is a schematic diagram of telecommunication pipeline data of a terminal. As shown in FIG. 1, the telecommunication pipeline data may include information collected by Lampsite/Pico, an evolved NodeB (eNB) or a radio network controller (RNC), a unified service node (USN), a unified packet gateway (UGW), and the like. The present disclosure is related to an MR collected from an RNC and Over The Top (OTT) data collected on a Gn interface.

In this application, the telecommunication pipeline data of the terminal may further include radio signal sampling information and position information of the terminal. The radio signal sampling information of the terminal may include information in an MR of the terminal, information collected on an interface, and parameter information of a base station. The information in the MR of the terminal may include reference signal received power (RSRP), reference signal received quality (RSRQ), a signal to interference plus noise ratio (SINR), a timing advance (TA), eNB identification (eNB-ID), a cell identity (CELL ID), transmit power of the terminal, and the like. The information collected on the interface may include information collected on a Gn interface, a Gi interface, and an EC interface. A parameter of the base station may include information such as a station height of the base station, a frequency band of the base station, a direction angle of the base station, a downtilt angle of the base station, latitude and longitude of the base station, and cell transmit power of the base station. The position information of the terminal is included in a record including position information in the telecommunication pipeline data, for example, a record generated when software such as TOUCHMEDIA or Didi Chuxing operates.

It can be learned by analyzing the other approaches that, although the radio signal sampling information is used in a positioning method in the other approaches, the radio signal sampling information is used in an extremely small range. For example, only RSS in the telecommunication pipeline data is used in a triangle positioning method, and other telecommunication information such as context information, an acceleration, and an angle is not effectively used.

Based on the foregoing case, the applicant considers that the telecommunication pipeline data includes massive information, and a telecommunications operator usually serves a large urban population. Therefore, the telecommunication pipeline data may be an important data source for obtaining fine-grained spatiotemporal behavior information of an urban user, and performing group analysis using the telecommunication pipeline data has a natural advantage. Further, a spatiotemporal behavior of the terminal is mined from the telecommunication pipeline data to implement terminal positioning. This has relatively strong feasibility.

To fully and properly use the telecommunication pipeline data, the radio signal sampling information and the position information of the terminal in a telecommunication pipeline are analyzed based on a data mining technology in this application, and a relationship between the radio signal sampling information and the position information of the terminal is determined, that is, a predictive model is obtained. Therefore, position information of the terminal at a current moment can be obtained by means of prediction based on the predictive model and radio signal sampling information of the terminal at the current moment.

To make the predictive model have stronger pertinence and make a prediction result more accurate, different geographic ranges may be delimited in this application in order to train historical data in the different geographic ranges to obtain predictive models for the different geographic ranges. For example, delimitation may be performed based on different urban regions. Shanghai is used as an example. Different urban regions such as Pudong New Area, Jiading District, Huangpu District, Jinshan District, Xuhui District, Jing'an District, and Yangpu District may separately correspond to different predictive models.

An example of terminal positioning in a target region is used in the following for description. The target region in this application is a region with a specified area. For ease of collecting statistics about radio signal sampling information and position information of a plurality of terminals at a plurality of historical moments, the target region is especially a densely populated region or a region with plenty of people.

Figure 2:
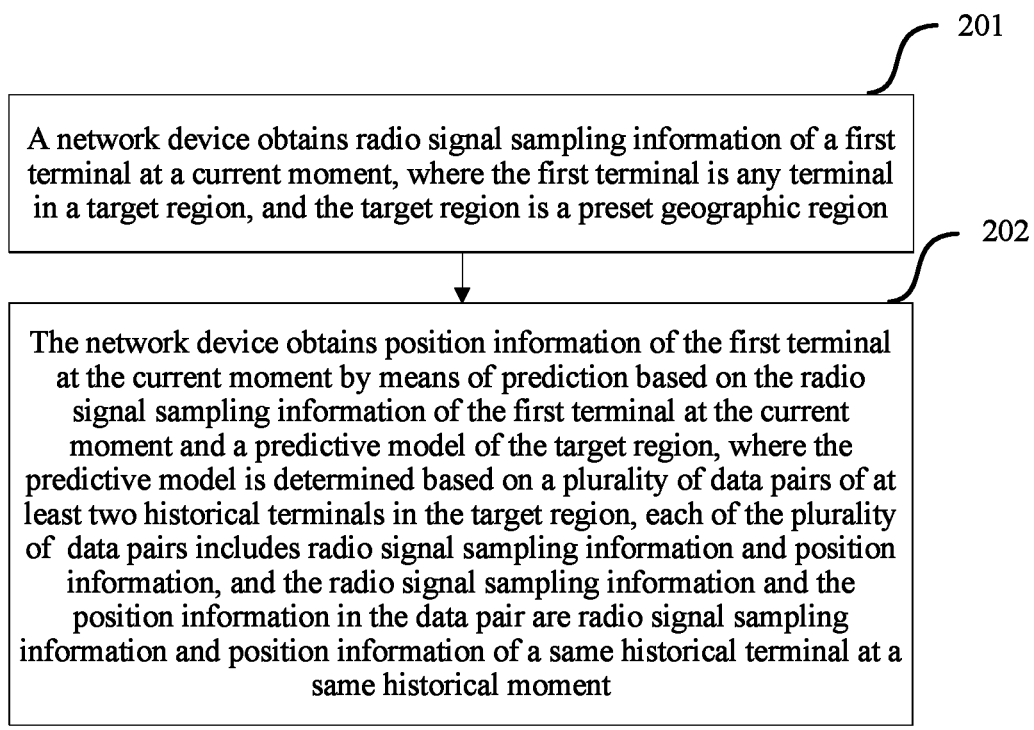
FIG. 2 is a schematic flowchart of a terminal positioning method according to this application.

To implement terminal positioning in a target region, FIG. 2 shows an example of a schematic flowchart of a terminal positioning method according to this application. As shown in FIG. 2, the method includes the following steps.

Step 201: A network device obtains radio signal sampling information of a first terminal at a current moment, where the first terminal is any terminal in a target region, and the target region is a preset geographic region.

Step 202: The network device obtains position information of the first terminal at the current moment by means of prediction based on the radio signal sampling information of the first terminal at the current moment and a predictive model of the target region, where the predictive model is determined based on a plurality of data pairs of at least two historical terminals in the target region, each of the plurality of data pairs includes radio signal sampling information and position information, and the radio signal sampling information and the position information in the data pair are radio signal sampling information and position information of a same historical terminal at a same historical moment.

In this application, the predictive model is determined based on the plurality of data pairs of the at least two historical terminals in the target region, and each of the plurality of data pairs includes the radio signal sampling information and the position information. Both the radio signal sampling information and the position information are information that can be directly obtained in the other approaches without a need of additional collection such that positioning costs can be effectively reduced. In addition, the predictive model is obtained by means of extensive data training in the target region, has relatively strong error tolerance and error-correction capabilities, and can accurately reflect a relationship between radio signal sampling information and position information of a terminal such that a problem of positioning is inaccurate because RSS is interfered with due to multipath attenuation, non-line-of-sight blockage, and the like, and because a quantity of base stations connected to the terminal is insufficient is well avoided. Therefore, positioning is performed based on the predictive model and the radio signal sampling information of the terminal in the present disclosure such that terminal positioning accuracy can be effectively improved, and a positioning error can be reduced. This application has a high practical value.

In this application, the predictive model of the target region needs to be first built, and then terminal positioning is performed based on the predictive model. That is, this application includes two stages. The first stage is a predictive model building stage, and the second stage is a positioning stage.

The network device in this application may be one server having a processing capability, and the first stage and the second stage are executed by a same server in this case. Alternatively, the network device may be two servers having a processing capability, and the first stage and the second stage are separately executed by different servers in this case. To reduce server processing load and improve processing efficiency, the first stage and the second stage are separately executed by different servers in this application.

The following separately describes the two stages.

Stage 1: Predictive model building stage.

The predictive model in this application may be determined by the network device in the following manner of obtaining, by the network device by means of screening from radio signal sampling information in the plurality of data pairs of the at least two terminals, a specified radio signal feature whose relevance to a position feature in position information in the plurality of data pairs is greater than or equal to a first threshold, and establishing a function relationship between the specified radio signal feature and the position feature, to obtain the predictive model.

A plurality of data pairs of any one of the at least two historical terminals are obtained based on the following method. For a first historical terminal, obtaining, by the network device, radio signal sampling information of the first historical terminal at a plurality of first historical moments and position information of the first historical terminal at a plurality of second historical moments, where the first historical terminal is any one of the at least two historical terminals, determining, by the network device, a clock correspondence between the plurality of first historical moments of the first historical terminal and the plurality of second historical moments of the first historical terminal according to a first preset rule, where the first preset rule is any one of a plurality of preset rules, and calculating, by the network device for the first preset rule, a sum of distances between a base station to which the first historical terminal belongs and the first historical terminal at the plurality of first historical moments, and determining a plurality of data pairs of the first historical terminal based on a target clock correspondence, where the target clock correspondence is a clock correspondence in which the sum of distances between the base station to which the first historical terminal belongs and the first historical terminal at the plurality of first historical moments is minimum in the plurality of preset rules.

It can be learned from the foregoing content that, in this application, the predictive model is trained for a determined target region based on the plurality of data pairs of the at least two historical terminals in the target region, that is, the predictive model is obtained by means of extensive historical data training. Generally, a larger data amount indicates that the predictive model obtained by means of training is closer to an actual situation. Correspondingly, a data processing amount is larger, and a processing time is longer. In this application, persons skilled in the art may comprehensively consider the foregoing two factors to select an appropriate historical data amount, that is, to select historical data of a plurality of terminals in a specified time period. For example, historical data of 1000 terminals in a time period from 8:00 to 22:00 of one day may be selected.

Figure 3:
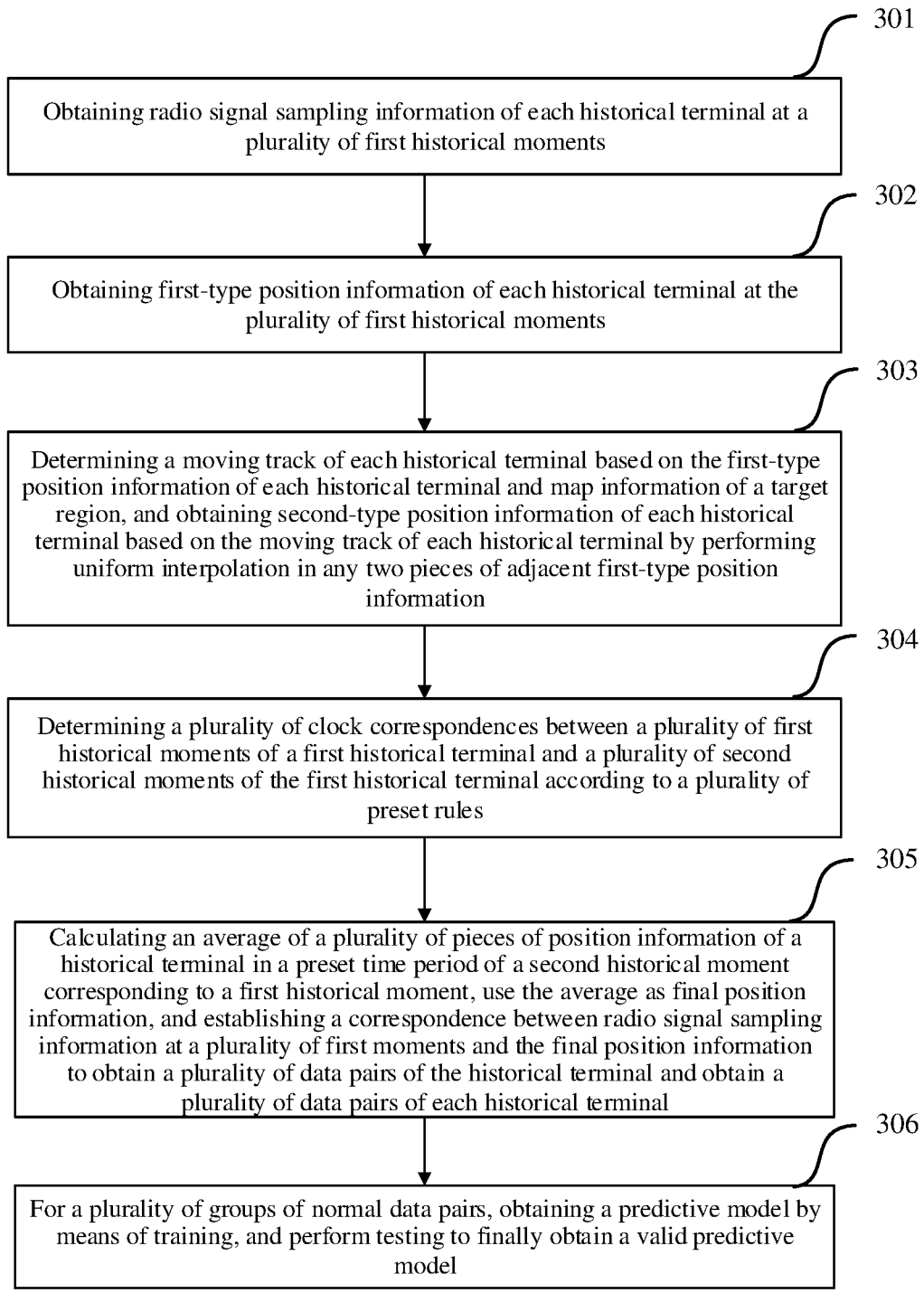
FIG. 3 is a schematic flowchart of predictive model building in this application.

FIG. 3 is a schematic flowchart of predictive model building in this application. Referring to FIG. 3, an example in which historical data of 1000 historical terminals in a time period from 8:00 to 22:00 of one day is selected for predictive model training is used for description in the following. The FIG. 3, includes the following steps.

Step 301: Obtaining radio signal sampling information of each historical terminal at a plurality of first historical moments, that is, obtain radio signal sampling information of the 1000 historical terminals in a time period from 8:00 to 22:00. For example, the radio signal sampling information may be information collected by an RNC.

Figure 4:
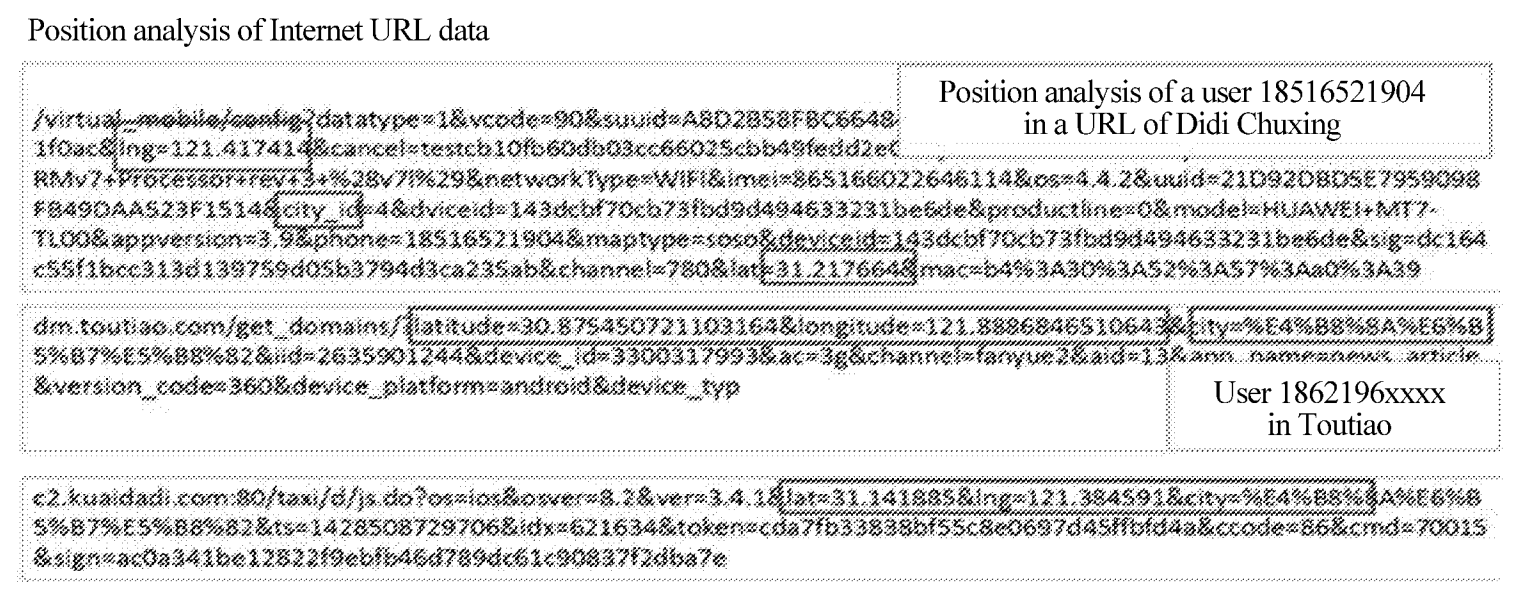

Step 302: Obtaining first-type position information of each historical terminal at the plurality of first historical moments, that is, obtain first-type position information of the 1000 historical terminals in the time period from 8:00 to 22:00. In this application, the first-type position information is position information that is obtained by parsing data collected by the network device through a Gn interface. Further, after deep packet inspection (DPI) is performed on the data collected through the Gn interface, a URL is obtained such that global positioning system (GPS) position information, that is, the first-type position information, is obtained, for example, GPS position information obtained from a URL of TOUCHMEDIA or Didi Chuxing. As shown in FIG. 4, FIG. 4 is an example diagram of a URL including position information. However, this application is not limited to obtaining the position information through the Gn interface. For example, if an operator and an OTT position service provider sign an agreement, position information provided by an OTT position service may be directly obtained.

It should be noted that, for step 301 and step 302, step numbers are merely an example description of an execution process. A sequence of steps is not explicitly and further limited in this application. For example, step 301 may be first performed to obtain the radio signal sampling information of each historical terminal, and then step 302 is performed to obtain the first-type position information of each historical terminal, step 302 may be first performed to obtain the first-type position information of each historical terminal, and then step 301 is performed to obtain the radio signal sampling information of each historical terminal, or step 301 and step 302 are simultaneously performed, that is, the radio signal sampling information and the first-type position information of each historical terminal are synchronously obtained.

Because the radio signal sampling information and the first-type position information of each terminal are separately recorded in different parts of telecommunication pipeline data, and the radio signal sampling information and the first-type position information are separately collected by different devices, sampling frequency of the radio signal sampling information may be different from sampling frequency of the first-type position information. Further, a clock of a device collecting the radio signal sampling information may not be synchronized with a clock of a device collecting the first-type position information.

In view of these problems, for different sampling frequency, the sampling frequency of the obtained radio signal sampling information and the sampling frequency of the obtained first-type position information may be determined after step 302. Generally, the sampling frequency of the radio signal sampling information is much greater than the sampling frequency of the first-type position information. Therefore, the following steps in this application mainly analyze and describe a case in which the sampling frequency of the radio signal sampling information is greater than the sampling frequency of the first-type position information.

For example, for a historical terminal, radio signal sampling information is sampled every eight seconds (an MR record collected by the RNC is obtained every eight seconds). Table 2 is a sampling example of radio signal sampling information in a time period. As shown in Table 2, a first group of radio signal sampling information of the historical terminal is collected at 10:00:00, a second group of radio signal sampling information is collected at 10:00:08, a third group of radio signal sampling information is collected at 10:00:16, a fourth group of radio signal sampling information is collected at 10:00:24, and a fifth group of radio signal sampling information is collected at 10:00:32.

TABLE 2

Sampling example of radio signal sampling information in a time period

| | Sampling time point | | | | |
|---|---|---|---|---|---|
| | 10:00:00 | 10:00:08 | 10:00:16 | 10:00:24 | 10:00:32 |
| Radio signal sampling information | First group of radio signal sampling information | Second group of radio signal sampling information | Third group of radio signal sampling information | Fourth group of radio signal sampling information | Fifth group of radio signal sampling information |

For example, first-type position information is sampled every one minute (TOUCHMEDIA reports position information every one minute). Table 3 is a sampling example of first-type position information in a time period. As shown in Table 3, a first piece of position information of the historical terminal is collected at 10:00:00, a second piece of position information is collected at 10:01:00, a third piece of position information is collected at 10:02:00, a fourth piece of position information is collected at 10:03:00, and a fifth piece of position information is collected at 10:04:00.

TABLE 3

Sampling example of first-type position information in a time period

| | Sampling time point | | | | |
|---|---|---|---|---|---|
| | 10:00:00 | 10:01:00 | 10:02:00 | 10:03:00 | 10:04:00 |
| First-type position information | First piece of position information | Second piece of position information | Third piece of position information | Fourth piece of position information | Fifth piece of position information |

It can be learned from content in Table 2 and Table 3 that, there is a great difference between the sampling frequency of the radio signal sampling information and the sampling frequency of the position information. In the case of clock synchronization, if the radio signal sampling information is directly matched with the first-type position information, matched position information cannot be found for a large amount of radio signal sampling information and cannot be fully used in a predictive model training process. For example, the first group of radio signal sampling information collected at 10:00:00 may match the first piece of position information collected at 10:00:00, but matched position information cannot be found for radio signal sampling information collected in a time period from 10:00:00 to 10:01:00. For this case, second-type position information may be introduced in this application. Therefore, matched position information can be found for all radio signal sampling information such that the radio signal sampling information and the position information are fully used. Further, step 303 may be performed.

Step 303: Determining a moving track of each historical terminal based on the first-type position information of each historical terminal and map information of a target region, and obtaining second-type position information of each historical terminal based on the moving track of each historical terminal by performing uniform interpolation in any two pieces of adjacent first-type position information.

Figure 5:
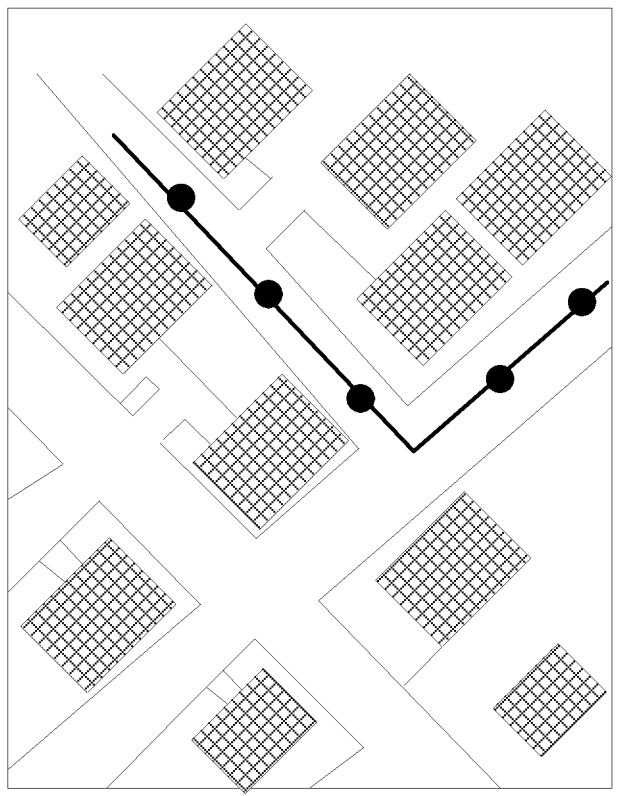
FIG. 5 is a schematic diagram of a moving track determined according to first-type position information and map information.

In this application, the map information of the target region may be prestored. The map information includes building position information, road position information, and the like. FIG. 5 is a schematic diagram of a moving track of a historical terminal determined based on first-type position information and map information. Five pieces of first-type position information marked in FIG. 5 may be the five pieces of position information collected in Table 3. Further, as shown in FIG. 5, a black spot is first-type position information actually extracted from a URL. A moving track of a user holding the historical terminal on a road, that is, the moving track of the historical terminal, may be obtained by means of prediction based on the building position information and the road position information in the map information, and the five pieces of position information. For a specific moving track prediction process, refer to the other approaches. For example, a probability of matching each point and each road in a path and a road transition probability may be calculated, and then a walking path with a maximum probability is obtained by means of calculation such that a moving track obtained by means of map matching is obtained. Details are not described herein.

To make position information more dense, interpolation may be performed between any two pieces of first-type position information based on the predicted moving track of the historical terminal, and a specific quantity of to-be-interpolated values may be circumstantially set. For example, 28 values may be interpolated between the first position information collected at 10:00:00 and the second piece of position information collected at 10:01:00, that is, 28 pieces of second-type position information are interpolated such that one piece of corresponding position information exists every two seconds.

Figure 6:
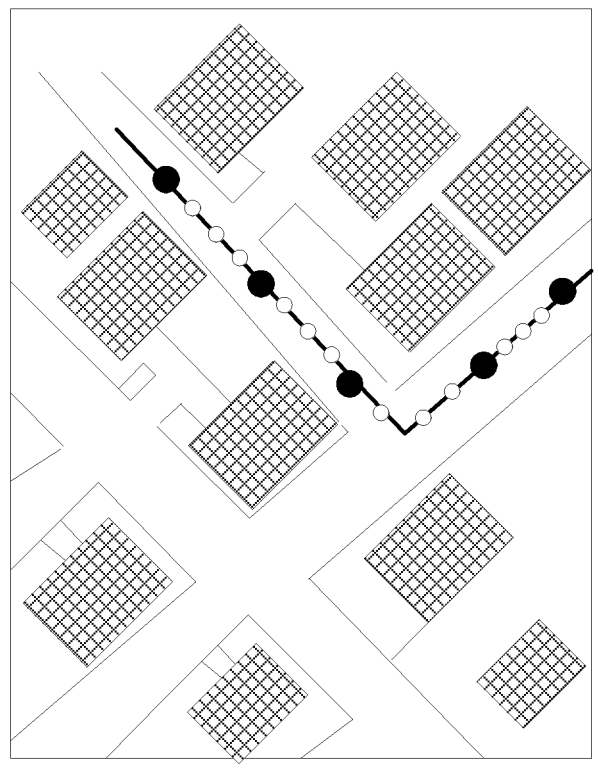
FIG. 6 is a schematic diagram of determining second-type position information according to first-type position information and a moving track.

FIG. 6 is a schematic diagram of determining second-type position information based on first-type position information and a moving track. As shown in FIG. 6, three position points are interpolated between any two pieces of first-type position information on a determined moving track, and position information of the three position points is second-type position information. When interpolation is further performed, if it is estimated based on the predicted moving track of the terminal and each piece of first-type position information that a moving rate of the historical terminal does not change much, a uniform interpolation method may be used, that is, 28 pieces of position information are uniformly interpolated in a track during 10:00:00 to 10:01:00. If it is estimated based on the predicted moving track of the historical terminal and each piece of first-type position information that the moving rate of the historical terminal obviously changes, corresponding non-uniform interpolation may be performed based on an estimated change status.

In this application, the first-type position information of the historical terminal is sampled every one minute. One piece of corresponding position information may exist every two seconds after interpolation, that is, a time interval between two pieces of position information is relatively short. For such a relatively short time interval, a motion status usually does not change much. Therefore, a uniform interpolation manner may be usually used. For example, when a user holding the historical terminal is walking on a road, one piece of corresponding first-type position information exists every one minute. For two pieces of adjacent first-type position information, 28 pieces of second-type position information are uniformly interpolated between the two pieces of adjacent first-type position information based on the predicted moving track of the historical terminal.

The foregoing content is to resolve a problem of different sampling frequency by means of interpolation. Currently, a possible clock asynchronization problem is further analyzed.

A terminal a is used as an example. It is assumed that a clock on which radio signal sampling information of the terminal a is based is a standard clock, but there is a deviation between a clock on which first-type position information is based and the standard clock. For example, the clock on which the first-type position information is based is earlier than the standard clock by one minute. Data in Table 1 and Table 2 is still used as an example. In this case, position information that matches the radio signal sampling information corresponding to 10:00:00 is the position information corresponding to 10:01:00. If clock asynchronization is not considered, and the position information that matches the radio signal sampling information corresponding to 10:00:00 is directly determined as the position information corresponding to 10:00:00, there is a deviation between a predictive model and an actual situation. Consequently, a terminal position predicted based on the predictive model is not accurate. For this case, a clock deviation may be corrected by matching radio signal sampling information with position information in this application in order to implement correct matching between the radio signal sampling information and the position information. Further, step 304 may be performed.

Step 304: Determining a plurality of clock correspondences between a plurality of first historical moments of a first historical terminal and a plurality of second historical moments of the first historical terminal according to a plurality of preset rules, calculate a sum of distances between a base station to which the first historical terminal belongs and the first historical terminal at the plurality of first historical moments for the plurality of clock correspondences, and then determine, by means of comparison, a time offset between a clock on which radio signal sampling information of the first historical terminal is based and a clock on which position information of the first historical terminal is based, to obtain a target clock correspondence.

Further, a terminal (terminal b) is used as an example. Table 4 is an example of obtained radio signal sampling information and obtained position information (including first-type position information and second-type position information) of the terminal b. As shown in Table 4, a first group of radio signal sampling information is a radio signal sampling information record corresponding to 10:00:00 on a radio signal sampling information collection clock, and (x1, y1) is a position information record corresponding to 10:00:00 on a position information collection clock.

TABLE 4

Sampling example of radio signal sampling information and position information

| Sampling time | Radio signal sampling information record | Position information record |
| --- | --- | --- |
| 10:00:00 | First group of radio signal sampling information | (x1, y1) |
| 10:00:02 | | (x2, y2) |
| 10:00:04 | | (x3, y3) |
| 10:00:06 | | (x4, y4) |
| 10:00:08 | Second group of radio signal sampling information | (x5, y5) |
| 10:00:10 | | (x6, y6) |
| 10:00:12 | | (x7, y7) |
| 10:00:14 | | (x8, y8) |
| 10:00:16 | Third group of radio signal sampling information | (x9, y9) |
| ... | ... | ... |

In this application, the radio signal sampling information includes position information of a base station connected to the terminal b such that the position information of the base station connected to the terminal b in each group of radio signal sampling information can be learned. It should be noted that the radio signal sampling information may include one base station connected to the terminal b, or may include two or more base stations connected to the terminal b. If the radio signal sampling information includes only one connected base station, position information of the connected base station may be directly used for subsequent calculation. If the radio signal sampling information includes two or more connected base stations, position information of a connected base station corresponding to maximum RSS received by the terminal b may be selected for subsequent calculation, or average position information of the two or more connected base stations may be obtained by means of calculation, and the average position information is used for subsequent calculation. In this application to reduce calculation complexity, if there are two or more connected base stations, the position information of the connected base station corresponding to the maximum RSS received by the terminal b is preferential selected for subsequent calculation.

Because of possible clock asynchronization, an attempt may be made to establish correspondences between a radio signal sampling information record and a position record at a same time point or different time points based on the plurality of preset rules. Specific corresponding cases are as follows.

In a first corresponding case of a preset rule, a correspondence between a radio signal sampling information record and a position record that are in a same row in Table 4 is established. For the first group of radio signal sampling information, a distance between the base station connected to the terminal b and the terminal b is determined based on the position information of the base station connected to the terminal b and a position information record (x1, y1) of the terminal, and is marked as a distance a1. Likewise, for all groups of radio signal sampling information, all distances between the base station connected to the terminal b and the terminal b may be determined, and are marked as a distance a2 to a distance aP. Therefore, a sum of the distance a1 to the distance aP may be obtained, and is marked as D1.

It should be noted that the first corresponding case is a direct correspondence in terms of time point. Therefore, corresponding position information can be found for each group of radio signal sampling information. However, when a misplacement correspondence is established in terms of time point, partial data is lost. For example, when a two-second backward misplacement correspondence is established (referring to a second corresponding case), the last group of radio signal sampling information may have no corresponding position information. In this case, the distance between the base station connected to the terminal b and the terminal b cannot be calculated. Consequently, a quantity of calculated distances is reduced by 1. When a distance sum calculated based on this case is compared with a distance sum calculated based on the first corresponding case, an obvious deviation exists. For another example, when a two-second forward misplacement correspondence is established, the first group of radio signal sampling information may have no corresponding position information. In this case, the distance between the base station connected to the terminal b and the terminal b cannot be calculated. Consequently, a quantity of calculated distances is reduced by 1. In view of the foregoing case, partial data close to a sampling start point and a sampling end point may not be considered in this application such that quantities of calculated distances are equal. For example, when distance sums are calculated based on various corresponding cases in this application, the last group of radio signal sampling information or the last two groups of radio signal sampling information are not considered.

In a second corresponding case of a preset rule, as shown in Table 5, a correspondence between a radio signal sampling information record and a position record collected later than the radio signal sampling information record by two seconds is established. For a first group of radio signal sampling information, a distance between the base station connected to the terminal b and the terminal b is determined based on the position information of the base station connected to the terminal b and a position information record (x2, y2) of the terminal b, and is marked as a distance b1. Likewise, for all groups of radio signal sampling information, all distances between the base station connected to the terminal b and the terminal b may be determined, and are marked as a distance b2 to a distance bP. Therefore, a sum of the distance b1 to the distance bP may be obtained, and is marked as D2.

TABLE 5

Correspondence between a radio signal sampling information record and a position record

| Radio signal sampling time (first historical moment) | Radio signal sampling information record | Position information record | Position information sampling time (second historical moment) |
| --- | --- | --- | --- |
| 10:00:00 | First group of radio signal sampling information | (x2, y2) | 10:00:02 |
| 10:00:02 |  | (x3, y3) | 10:00:04 |
| 10:00:04 |  | (x4, y4) | 10:00:06 |
| 10:00:06 |  | (x5, y5) | 10:00:08 |
| 10:00:08 | Second group of radio signal sampling information | (x6, y6) | 10:00:10 |
| 10:00:10 |  | (x7, y7) | 10:00:12 |
| 10:00:12 |  | (x8, y8) | 10:00:14 |
| 10:00:14 |  | (x9, y9) | 10:00:16 |
| 10:00:16 | Third group of radio signal sampling information | (x10, y10) | 10:00:18 |
| ... | ... | ... | ... |

In a third corresponding case of a preset rule, as shown in Table 6, a correspondence between a radio signal sampling information record and a position record collected later than the radio signal sampling information record by four seconds is established. For a first group of radio signal sampling information, a distance between the base station connected to the terminal and the terminal is determined based on the position information of the base station connected to the terminal and a position information record (x3, y3) of the terminal, and is marked as a distance c1. Likewise, for all groups of radio signal sampling information, all distances between the base station connected to the terminal and the terminal may be determined, and are marked as a distance c2 to a distance cP. Therefore, a sum of the distance c1 to the distance cP may be obtained, and is marked as D3.

TABLE 6

Correspondence between a radio signal sampling information record and a position record

| Radio signal sampling time (first historical moment) | Radio signal sampling information record | Position information record | Position information sampling time (second historical moment) |
| --- | --- | --- | --- |
| 10:00:00 | First group of radio signal sampling information | (x3, y3) | 10:00:04 |
| 10:00:02 |  | (x4, y4) | 10:00:06 |
| 10:00:04 |  | (x5, y5) | 10:00:08 |
| 10:00:06 |  | (x6, y6) | 10:00:10 |
| 10:00:08 | Second group of radio signal sampling information | (x7, y7) | 10:00:12 |
| 10:00:10 |  | (x8, y8) | 10:00:14 |
| 10:00:12 |  | (x9, y9) | 10:00:16 |
| 10:00:14 |  | (x10, y10) | 10:00:18 |
| 10:00:16 | Third group of radio signal sampling information | (x11, y11) | 10:00:20 |
| ... | ... | ... | ... |

Generally, three or more corresponding cases may be considered based on a possible clock deviation. The foregoing three corresponding cases are merely examples for expression. When a corresponding case is further considered, a case of 4-second-misplacement or 1-minute-misplacement may be directly considered, and this is not enumerated in this application.

For the foregoing three enumerated cases, D1, D2, and D3 are compared. If it is determined, by means of comparison, that D3 is the smallest, it may be determined that for the terminal b, a time offset between a clock on which the radio signal sampling information is based and a clock on which the position information is based is four seconds. If the clock on which the radio signal sampling information of the terminal b is based is a standard clock, the clock on which the position information is based is earlier than the standard clock by four seconds. After the foregoing time offset is considered, it may be determined that the third corresponding case is a corresponding case of correct matching.

Based on the third case, after the time offset of four seconds is subtracted from the clock on which the position information is based, a sampling example of the radio signal sampling information and the position information shown in Table 6 is obtained.

TABLE 7

Sampling example of radio signal sampling information and position information (after a time offset is considered)

| Sampling time | Radio signal sampling information record | Position information record |
| --- | --- | --- |
| 10:00:00 | First group of radio signal sampling information | (x3, y3) |
| 10:00:02 |  | (x4, y4) |
| 10:00:04 |  | (x5, y5) |
| 10:00:06 |  | (x6, y6) |
| 10:00:08 | Second group of radio signal sampling information | (x7, y7) |
| 10:00:10 |  | (x8, y8) |
| 10:00:12 |  | (x9, y9) |
| 10:00:14 |  | (x10, y10) |
| 10:00:16 | Third group of radio signal sampling information | (x11, y11) |
| ... | ... | ... |

Further, it may be determined, based on the third corresponding case, that position information that directly matches a first group of radio signal sampling information is (x3, y3), position information that directly matches a second group of radio signal sampling information is (x7, y7), and position information that directly matches a third group of radio signal sampling information is (x11, y11).

In this application, the position information includes first-type position information and second-type position information, and the second-type position information is obtained by means of estimation and interpolation. Therefore, to improve accuracy, the position information needs to be further processed in this application. Further, step 305 may be performed.

Step 305: Calculating an average of a plurality of pieces of position information of a historical terminal in a preset time period of a second historical moment corresponding to a first historical moment, use the average as final position information, and establishing a correspondence between radio signal sampling information at a plurality of first moments and the final position information to obtain a plurality of data pairs of the historical terminal and obtain a plurality of data pairs of each historical terminal.

For example, for a first historical moment 10:00:00, an average of position information (x2, y2), (x3, y3), and (x4, y4) in a time period from two seconds before a second historical moment corresponding to the first historical moment to two seconds after the second historical moment may be calculated, and the average is used as final position information at 10:00:00. In addition, a correspondence between radio signal sampling information at 10:00:00 and the final position information at 10:00:00 is established to obtain a data pairs. Likewise, for each group of radio signal sampling information, a correspondence between radio signal sampling information and position information may be established, to obtain a plurality of data pairs. A data pairs is radio signal sampling information and position information of a same historical terminal at a same historical moment.

It should be noted that an example in which the clock on which the radio signal sampling information is based is a standard clock is used for description above. In this application, another perspective, that is, a case in which the clock on which the position information is based is a standard clock may be considered.

The position information in the group of obtained data pairs is determined based on M (M=3) pieces of position information obtained by the terminal in a preset time period of the second historical moment (two seconds before and after). Because only one piece of radio signal sampling information (that is, radio signal sampling information collected at the historical moment) exists in a preset time period of the first historical moment (from two seconds before the first historical moment to two seconds after the first historical moment) corresponding to the second historical moment, a data pair may be directly established using the radio signal sampling information. If sampling frequency of the radio signal sampling information is relatively large or the preset time period has a relatively large range, an average of a plurality of pieces of radio signal sampling information in the preset time period of the first historical moment corresponding to the second historical moment may be calculated to establish a data pair. For example, if a preset time period of a historical moment is from eight seconds before the historical moment to eight seconds after the historical moment, for a historical moment 10:00:08, an average of the first group of radio signal sampling information, the second group of radio signal sampling information, and the third group of radio signal sampling information may be calculated, used as final radio signal sampling information at the historical moment 10:00:08, and used as a basis to establish a data pair in a subsequent process.

Further, it is hard to avoid some data with a relatively large error in massive collected data, that is, abnormal data. If the abnormal data is not processed, a deviation easily occurs in a calculation result. Therefore, in this application, after the plurality of data pairs are obtained, for each data pairs, the distance between the connected base station and the terminal is determined based on the position information of the connected base station in the radio signal sampling information and final position information of the terminal. If the distance between the connected base station and the terminal is greater than a preset distance threshold, it may be determined that this data pairs is an abnormal data pairs in order to delete this data pairs. The preset distance threshold may be set by persons skilled in the art based on experience. For example, the preset distance threshold may be set to 300 meters.

Step 306: For a plurality of groups of normal data pairs, obtaining a predictive model by means of training, and perform testing to finally obtain a valid predictive model. Radio signal sampling information in a data pair includes a full radio signal feature. Therefore, the radio signal sampling information is fully used in the predictive model determined in this application, and performing positioning using the predictive model has higher positioning precision in comparison with the other approaches.

The predictive model in this application is a regression model. After the plurality of groups of normal data pairs are trained, the obtained predictive model is a function relationship between a specified radio signal feature in the radio signal sampling information and a position feature in the position information. The specified radio signal feature includes a radio signal feature closely related to the position feature and an extension feature of the radio signal feature. The specified radio signal feature includes a radio signal feature whose relevance to the position feature is greater than or equal to a first threshold and an extension feature of the radio signal feature. Relevance between the specified radio signal feature and the position feature may be obtained using various variable relevance calculation methods in the other approaches. The first threshold may be set by persons skilled in the art based on experience. That is, there is a relatively strong association relationship between the specified radio signal feature and the position feature. Radio signal features other than the specified radio signal feature are some features having less impact on the position feature. Because the position information is less affected when values corresponding to the radio signal features change, the radio signal features may not be considered in predictive model building such that the predictive model is simpler and more accurate.

In this application, the specified radio signal feature includes any one or any combination of a first-type signal feature, a second-type signal feature, or a third-type signal feature. The first-type signal feature is a radio signal feature closely related to position information, such as RSRP, RSRQ, or an SINR, and a value corresponding to the first-type signal feature is directly obtained from collected radio signal sampling information. The second-type signal feature includes a primary extension feature closely related to position information, such as a range-based positioning calculation result, and a value corresponding to the second-type signal feature is calculated based on a value corresponding to one or more first-type signal features. The third-type signal feature includes a secondary extension feature closely related to position information, such as a speed of the terminal, and a value corresponding to the third-type signal feature is obtained based on initial position information that is of the terminal at different moments and that is obtained based on the predictive model by means of prediction. Initial position information of the terminal at one moment is obtained based on the predictive model, and a value corresponding to a first-type signal feature and/or a value corresponding to a second-type signal feature of the terminal at the moment. In this application, the specified radio signal feature mainly includes the following radio signal features and extension features of the radio signal features.

(1) Single-point radio signal feature (first-type signal feature): mainly including information in an MR of a terminal and a parameter of a base station. The MR of the terminal may include information such as RSRP, RSRQ, an SINR, a TA, a primary downlink scrambling code, an antenna height, a direction angle, a mechanical tilt angle, an electrical downtilt angle, total cell power, common pilot channel power, transmit power of the terminal, and a position of the base station. The parameter of the base station may include information such as a station height of the base station, a frequency band of the base station, a direction angle of the base station, a downtilt angle of the base station, latitude and longitude of the base station, and cell transmit power of the base station.

(2) Time window association feature (first-type signal feature): single-point radio signal features of all radio signal sampling information in a small time window in which radio signal sampling information at a historical moment is located.

(3) Range-based positioning calculation result (second-type signal feature)

(4) Single-point association feature (second-type signal feature): mainly including an association feature of radio signal sampling information at a historical moment and other information. As shown in Table 8, Table 8 shows a design example of a group of such features.

TABLE 8

Single-point association feature design example

| Feature name | Feature description |
| --- | --- |
| preEntropy | The feature name preEntropy is entropy calculated using an identification (ID) of a connected base station in a previous MR. For example, six base stations [1, 1, 2, 2, 2, 1] are connected. In this case, base stations 1 occupy 0.5, and base stations 2 occupy 0.5. Therefore, the entropy is $-0.5 \times \log(0.5) - 0.5 \times \log(0.5)$. |
| curEntropy | Entropy calculated using an ID of a connected base station in a current MR |
| nxtEntropy | Entropy calculated using an ID of a connected base station in a next MR |
| preJaccardSim | The feature name preJaccardSim is a Jaccard similarity between an ID list of connected base stations in a previous MR and an ID list of connected base stations in a current MR. The Jaccard similarity is dividing a quantity of intersection sets of two sets by a quantity of union sets of the two sets. |
| nxtJaccardSim | Jaccard similarity between an ID list of connected base stations in a current MR and an ID list of connected base stations in a next MR |
| preSameBTS | Whether a connected base station in a current MR is the same as a connected base station in a previous MR |
| nxtSameBTS | Whether a connected base station in a current MR is the same as a connected base station in a next MR |
| preRSSIDiff | Subtract an RSSI of a connected base station in a previous MR from an RSSI of a connected base station in a current MR |
| nxtRSSIDiff | Subtract an RSSI of a connected base station in a current MR from an RSSI of a connected base station in a next MR |
| Regional record count | Record quantity in a region |
| Stability | For each region, calculate an average by hour using an RSSI, and then calculate a standard deviation of 24 hours |
| Vertical sensitivity Horizontal sensitivity | Vertical sensitivity and horizontal sensitivity are sensitivity to two directions of each region. One direction is clockwise, and the other direction is outward along a radial direction. |
| Real distance | Calculate an average of distances to a connected base station recorded in this region |
| Min distance | Calculate an average of distances to a closest base station recorded in this region |
| Distance diff | Real distance-min distance |
| Detect 1 BTS | Proportion of one base transceiver station (BTS) included in a record in this region |
| Detect 2 BTS | Proportion of two BTSs included in a record in this region |
| Detect 3 BTS | Proportion of three BTSs included in a record in this region |
| Detect 4 BTS | Proportion of four BTSs included in a record in this region |
| Detect 5 BTS | Proportion of five BTSs included in a record in this region |
| Detect 6 BTS | Proportion of six BTSs included in a record in this region |

(5) Third-type signal feature: obtained by means of calculation after an initial position prediction result is obtained based on the foregoing radio signal features and/or the second-type signal features using the predictive model. For example, features from (1) to (4) are input to the regression model, position information corresponding to radio signal sampling information of the terminal is calculated, and then a value corresponding to a feature such as a moving direction, a speed, or an acceleration of the terminal, that is, a value corresponding to the third-type signal feature, is calculated based on position information at a moment before and after each piece of position information.

It should be noted that the foregoing five types of radio signal features and extension features of the radio signals are merely an example for description. In actual application, based on the foregoing five types of radio signals and the extension features of the radio signals, addition and deletion may be performed as required. This application sets no specific limitation thereto.

In this application, after the predictive model is built in step 306 to ensure accuracy in subsequent positioning, at least radio signal sampling information of the terminal at a plurality of first historical moments and position information of the terminal at a plurality of second historical moments need to be obtained again in another historical time period, and used as test data to test the built predictive model. For example, after a predictive model of Pudong New Area of Shanghai is built based on historical data in Jan. 1, 2016 (radio signal sampling information and position information of 1000 terminals at a plurality of moments in a time period from 8:00:00 to 20:00:00), radio signal sampling information of the 1000 terminals at a plurality of first historical moments and position information of the 1000 terminals at a plurality of second historical moments may be obtained in a time period from 8:00:00 to 12:00:00 in Jan. 2, 2016, and used as test data to test the predictive model.

A specific test process is as follows. A test process of a terminal at a historical moment is used as an example. Position information may be obtained by means of prediction based on radio signal sampling information of the terminal at the historical moment using a predictive model, and the predicted position information is compared with position information in a test data pair corresponding to the historical moment. If a difference is in a preset difference range, it is determined that a test result of the terminal at the historical moment succeeds. The preset difference range may be set by persons skilled in the art based on experience. For example, a distance between the predicted position information and the position information obtained by the terminal at the moment may be less than or equal to three meters. All test data is tested in a similar manner. If a test result success proportion is greater than a preset proportion value, the predictive model is valid, and terminal positioning may be subsequently performed based on the predictive model. Otherwise, the predictive model needs to be modified. The preset proportion value may be set by persons skilled in the art based on experience. For example, the preset proportion value may be set to 90%.

Figure 7:
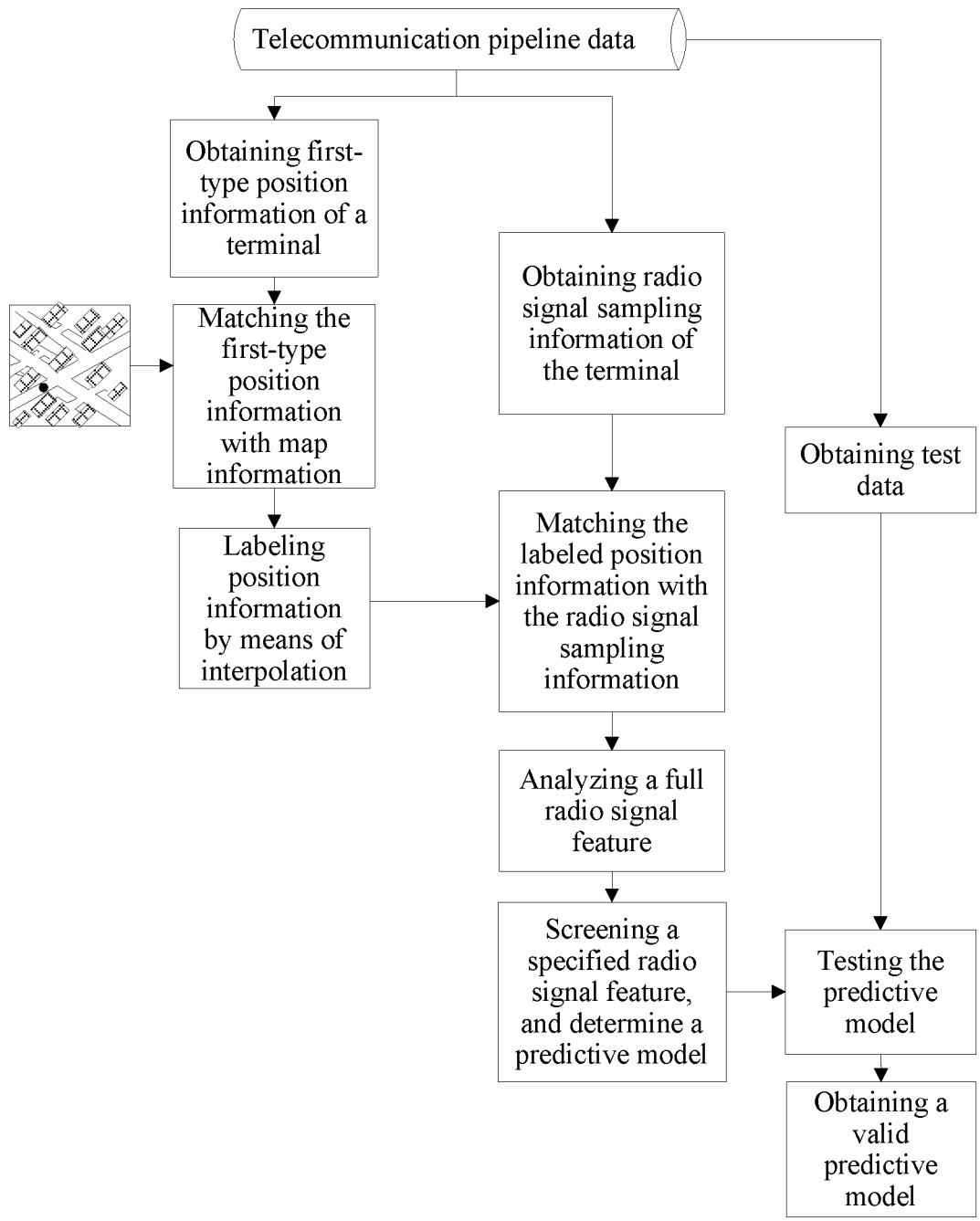
FIG. 7 is a vivid schematic diagram of predictive model building in this application.

FIG. 7 is another schematic flowchart of predictive model building in this application. FIG. 7 schematically shows a predictive model building process in this application in a more vivid manner, and corresponds to step 301 to step 306. Details are not described herein again.

In this application, the predictive model is determined based on the plurality of data pairs of the at least two historical terminals in the target region, and each of the plurality of data pairs includes the radio signal sampling information and the position information. Both the radio signal sampling information and the position information are information that can be directly obtained in the other approaches without a need of additional collection such that positioning costs can be effectively reduced. In addition, the predictive model is obtained by means of extensive data training in the target region, has relatively strong error tolerance and error-correction capabilities, and can accurately reflect a relationship between radio signal sampling information and position information of a terminal such that a problem of positioning is inaccurate because RSS is interfered with due to multipath attenuation, non-line-of-sight blockage, and the like, and because a quantity of base stations connected to the terminal is insufficient is well avoided. Therefore, positioning is performed based on the predictive model and the radio signal sampling information of the terminal in the present disclosure such that terminal positioning accuracy can be effectively improved, and a positioning error can be reduced. This application has a high practical value.

Stage 2: Positioning Stage.

After the valid predictive model is built, positioning may be performed, that is, the valid predictive model is put into use.

Further, when terminal positioning needs to be performed in the target region, the predictive model of the target region is obtained. The predictive model is a function relationship between the specified radio signal feature in the radio signal sampling information of the terminal and the position information of the terminal. If the specified radio signal feature includes a radio signal feature x1, a radio signal feature x2, a radio signal feature x3, . . . , and a radio signal feature xk, the predictive model is the function relationship between the position information and the specified radio signal feature including the radio signal feature x1, the radio signal feature x2, the radio signal feature x3, . . . , and the radio signal feature xk. An input vector of the predictive model is the radio signal feature x1, the radio signal feature x2, the radio signal feature x3, . . . , and the radio signal feature xk, and an output vector is predicted position information.

The radio signal sampling information of the first terminal at the current moment is collected, and the radio signal sampling information further includes a radio signal feature and a value corresponding to the radio signal feature. The value corresponding to the radio signal feature may be a specific numerical value, or may be information expressed in a non-numerical value form. For example, when the radio signal feature is reference signal received quality, a value corresponding to the reference signal received quality at the current moment may be obtained, and is used as the value corresponding to the radio signal feature. If the radio signal feature is an ID of a connected base station, or another radio signal feature expressed in a non-numerical value form, information corresponding to this type of radio signal feature may be obtained, and is used as the value corresponding to the radio signal feature. As shown in Table 9, Table 9 is an example of collected radio signal sampling information of a to-be-positioned terminal at a current moment.

TABLE 9

Example of radio signal sampling information of a to-be-positioned terminal at a current moment

| Radio signal feature | Corresponding value |
| --- | --- |
| RSRP | ** |
| RSRQ | ** |
| SINR | ** |

TABLE 9-continued

Example of radio signal sampling information of a
to-be-positioned terminal at a current moment

| Radio signal feature | Corresponding value |
|---|---|
| Mechanical tilt angle | Miss |
| Terminal transmit power | ** |
| Reference signal received quality | ** |
| SINR | ** |
| . . . | . . . |

As described above, the input vector of the obtained predictive model includes k radio signal features. In a positioning process, if more input vectors are input, positioning precision is higher. A case of missing values corresponding to partial features in the collected radio signal sampling information of the to-be-positioned terminal at the current moment is considered. In an actual process, persons skilled in the art may input, based on a specific situation, an input vector that can be obtained, to complete positioning of the to-be-positioned terminal. For example, a plurality of radio signal features in the k radio signal features may be input to obtain position information of the to-be-positioned terminal by means of prediction. For example, if k=20, and values corresponding to 15 radio signal features in the 20 radio signal features are obtained in an actual process, the values corresponding to the 15 radio signal features are input to the predictive model, and the position information of the to-be-positioned terminal can be accurately obtained by means of prediction. However, if only values corresponding to five radio signal features in the 20 radio signal features are obtained, the values corresponding to the five radio signal features are input to the predictive model, and the predicted position information of the to-be-positioned terminal may have a relatively large error. That is, to ensure positioning accuracy, a quantity of obtained values corresponding to radio signal features needs to be insufficient, and are close to a quantity of input vectors in the predictive model, or a percentage of a quantity of obtained values corresponding to radio signal features to a quantity of input vectors in the predictive model is greater than or equal to a preset percentage. The preset percentage may be set by persons skilled in the art based on experience. For example, the preset percentage may be set to 70%. In this application, the specified radio signal feature includes any one or any combination of a first-type signal feature, a second-type signal feature, or a third-type signal feature. A value corresponding to the first-type signal feature is extracted from the radio signal sampling information of the to-be-positioned terminal at the current moment. A value corresponding to the second-type signal feature is calculated based on a value corresponding to one or more first-type signal features. A value corresponding to the third-type signal feature is obtained using initial position information of the to-be-positioned terminal at the current moment and initial position information of the to-be-positioned terminal at an adjacent moment of the current moment. Initial position information of the to-be-positioned terminal at a moment is obtained by calculating, using the function relationship, a value corresponding to one or more first-type signal features and/or a value corresponding to one or more second-type signal features at the moment.

To ensure positioning precision and positioning accuracy, the specified radio signal feature includes all the first-type signal feature, the second-type signal feature, and the third-type signal feature in this application.

It is assumed that the radio signal feature x1, the radio signal feature x2, the radio signal feature x3, . . . , and a radio signal feature xn are the first-type signal feature, the radio signal feature xn, a radio signal feature xn+1, a radio signal feature xn+2, . . . , and a radio signal feature xm are the second-type signal feature, the radio signal feature xm, a radio signal feature xm+1, a radio signal feature xm+2, . . . , and the radio signal feature xk are the third-type signal feature.

Values corresponding to all or a part of the radio signal feature x1, the radio signal feature x2, the radio signal feature x3, . . . , and the radio signal feature xn may be obtained based on the collected radio signal sampling information (that is, content in Table 9) of the to-be-positioned terminal at the current moment. For example, values corresponding to RSRP, RSRQ, and an SINR may be directly obtained from Table 9.

Values corresponding to all or a part of the radio signal feature xn, the radio signal feature xn+1, the radio signal feature xn+2, . . . , and the radio signal feature xm may be obtained based on the obtained value corresponding to the first-type signal feature. For example, the radio signal feature xn+1 is a range-based positioning result, and a value corresponding to the radio signal feature xn+1 may be calculated based on a collected signal strength value (the value corresponding to the first-type signal feature) using a positioning method such as triangle positioning or conjugate curve positioning.

Values corresponding to all or a part of the radio signal feature xm, the radio signal feature xm+1, the radio signal feature xm+2, . . . , and the radio signal feature xk may be obtained based on the initial position information of the to-be-positioned terminal at the current moment and the initial position information of the to-be-positioned terminal at the adjacent moment of the current moment. Initial position information of the to-be-positioned terminal at a moment is obtained by calculating, using the function relationship, a value corresponding to one or more first-type signal features and/or a value corresponding to one or more second-type signal features at the moment. For example, the radio signal feature xm is a speed of the to-be-positioned terminal. In this case, the obtained values corresponding to both the first-type signal feature and the second-type signal feature may be first input to the predictive model in order to obtain the initial position information of the to-be-positioned terminal at the current moment (that is, perform rough positioning). Using a similar method, the initial position information of the to-be-positioned terminal at the adjacent moment (first several moments) of the current moment is obtained, and the speed of the terminal may be calculated based on the initial position information of the to-be-positioned terminal at the current moment and the initial position information of the to-be-positioned terminal at the adjacent moment of the current moment.

Using the foregoing process, the predictive model is input after the values separately corresponding to the first-type signal feature, the second-type signal feature, and the third-type signal feature are obtained, and the position information of the first terminal at the current moment is finally obtained by means of prediction. In this application, because the value corresponding to the third-type signal feature is obtained by means of rough positioning (that is, coarse-grained positioning), the value corresponding to the third-type signal feature is used as input of the predictive model again. Therefore, more fine-grained positioning can be implemented, and positioning precision is higher.

The foregoing content describes a case in which the specified radio signal feature includes all the first-type signal feature, the second-type signal feature, and the third-type signal feature. For other various cases, for example, a case in which the specified radio signal feature includes both the first-type signal feature and the second-type signal feature and a case in which the specified radio signal feature includes both the first-type signal feature and the third-type signal feature, refer to the foregoing case implementation.

Based on the positioning method in this application, in the predictive model building stage, a predictive model is obtained by means of training based on telecommunication pipeline data. In the positioning stage, only the radio signal sampling information of the terminal needs to be obtained such that positioning can be implemented. Therefore, in all processes in this application, only the telecommunication pipeline data is required, and the terminal does not need to perform another service request such that terminal processing load is reduced. In addition, in the positioning method in this application, the terminal can implement positioning without a need of starting a positioning apparatus such as a GPS or an Assisted GPS (AGPS).

A communication/data activity of a telecommunication terminal may have telecommunication pipeline data. Therefore, spatiotemporal information recorded in the telecommunication pipeline data can indicate a terminal-held crowd behavior more accurately, and a predictive model built using the telecommunication pipeline data can further reflect a relationship between radio signal sampling information and position information of a terminal more accurately and more practically. Using the predictive model can implement more accurate positioning, and has an extensive application prospect. For example, in an advertising consultancy industry, advertisement pricing and effect evaluation can be implemented by means of positioning based on outdoor population data. In a retail site selection industry, accurate site selection of a retail store can be implemented by means of positioning based on population data. In a transportation planning industry, scientific transportation planning can be implemented by means of positioning based on population data. In a tourism industry, an operation policy can be adjusted based on a population change. In roadside assistance, road alert and roadside assistance can be provided by means of positioning. In a public security industry, prediction, monitoring, and secure guidance can be implemented by means of positioning based on a public place population. In a search and navigation industry, indoor navigation can be provided by means of positioning using indoor data.

For the foregoing method procedure, this application further provides a network device. For specific content of the network device, refer to the foregoing method implementation.

Figure 8:
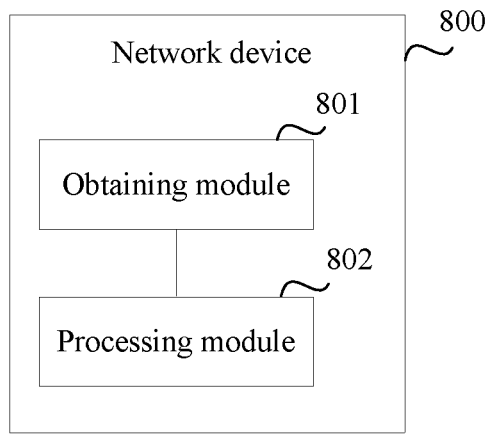
FIG. 8 is a schematic structural diagram of a network device according to this application.

FIG. 8 shows an example of a schematic structural diagram of a network device 800 according to this application. As shown in FIG. 8, the network device 800 includes an obtaining module 801 configured to obtain radio signal sampling information of a first terminal at a current moment, where the first terminal is any terminal in a target region, and the target region is a preset geographic region, and a processing module 802 configured to obtain position information of the first terminal at the current moment by means of prediction based on the radio signal sampling information of the first terminal at the current moment and a predictive model of the target region, where the predictive model is determined based on a plurality of data pairs of at least two historical terminals in the target region, each of the plurality of data pairs includes radio signal sampling information and position information, and the radio signal sampling information and the position information in the data pair are radio signal sampling information and position information of a same historical terminal at a same historical moment.

Optionally, the processing module 802 is further configured to obtain, by means of screening from radio signal sampling information in the plurality of data pairs, a specified radio signal feature whose relevance to a position feature in position information in the plurality of data pairs is greater than or equal to a first threshold, and establish a function relationship between the specified radio signal feature and the position feature to obtain the predictive model.

Optionally, the processing module 802 is further configured to obtain, based on at least radio signal sampling information of the to-be-positioned terminal at the current moment, a value corresponding to the specified radio signal feature, and perform calculation based on the predictive model and the value corresponding to the specified radio signal feature, to obtain position information of the to-be-positioned terminal at the current moment.

Optionally, the specified radio signal feature includes any one or any combination of a first-type signal feature, a second-type signal feature, or a third-type signal feature.

A value corresponding to the first-type signal feature is extracted from the radio signal sampling information of the to-be-positioned terminal at the current moment.

A value corresponding to the second-type signal feature is calculated based on a value corresponding to one or more first-type signal features.

A value corresponding to the third-type signal feature is obtained using initial position information of the to-be-positioned terminal at the current moment and initial position information of the to-be-positioned terminal at an adjacent moment of the current moment, and the initial position information of the to-be-positioned terminal at the current moment or the initial position information of the to-be-positioned terminal at the adjacent moment of the current moment is obtained by calculating, using the function relationship, a value corresponding to one or more first-type signal features and/or a value corresponding to one or more second-type signal features at the moment.

Optionally, the processing module 802 is further configured to obtain a plurality of data pairs of any one of the at least two historical terminals based on the following method. For a first historical terminal, obtaining radio signal sampling information of the first historical terminal at a plurality of first historical moments and position information of the first historical terminal at a plurality of second historical moments, where the first historical terminal is any one of the at least two historical terminals, and obtaining a plurality of data pairs of the first historical terminal based on the radio signal sampling information of the first historical terminal at the plurality of first historical moments and the position information of the first historical terminal at the plurality of second historical moments.

Optionally, the processing module 802 is further configured to determine a clock correspondence between the plurality of first historical moments of the first historical terminal and the plurality of second historical moments of the first historical terminal according to a first preset rule, where the first preset rule is any one of a plurality of preset rules, calculate, for the first preset rule, a sum of distances between a base station to which the first historical terminal belongs and the first historical terminal at the plurality of first historical moments, where a distance between the base station to which the first historical terminal belongs and the first historical terminal at each of the plurality of first historical moments is obtained using the following method of determining, by the network device based on the clock correspondence, a second historical moment corresponding to the first historical moment, and determining the distance between the base station and the first historical terminal at the first historical moment based on position information of the base station in radio signal sampling information at the first historical moment and position information of the first historical terminal at the second historical moment corresponding to the first historical moment, and determine the plurality of data pairs of the first historical terminal based on a target clock correspondence, where the target clock correspondence is a clock correspondence in which the sum of distances between the base station to which the first historical terminal belongs and the first historical terminal at the plurality of first historical moments is minimum in the plurality of preset rules.

Optionally, the radio signal sampling information of the first historical terminal at the plurality of first historical moments is obtained based on first frequency, the position information of the first historical terminal at the plurality of second historical moments is obtained based on second frequency, and the first frequency is less than the second frequency.

The processing module 802 is further configured to separately use the radio signal sampling information of the first historical terminal at the plurality of first historical moments as radio signal sampling information in the plurality of data pairs, and obtain, based on the target clock correspondence, the plurality of second historical moments corresponding to the plurality of first historical moments, and obtain position information in the plurality of data pairs of the first historical terminal based on at least the position information at the plurality of second historical moments corresponding to the plurality of first historical moments.

Optionally, the position information of the first historical terminal at the plurality of second historical moments includes first-type position information and/or second-type position information.

The first-type position information is position information that is obtained by parsing data collected by the network device through a Gn interface.

The second-type position information is position information that is obtained after the network device determines a moving track of the first historical terminal based on the first-type position information and map information of the target region, and performs interpolation in any two pieces of adjacent first-type position information based on the moving track.

In the foregoing embodiment of the present disclosure, the network device obtains the radio signal sampling information of the first terminal at the current moment. The first terminal is any terminal in the target region, and the target region is the preset geographic region. The network device obtains the position information of the first terminal at the current moment by means of prediction based on the radio signal sampling information of the first terminal at the current moment and the predictive model of the target region. In this application, the predictive model is determined based on the plurality of data pairs of the at least two historical terminals in the target region, and each of the plurality of data pairs includes the radio signal sampling information and the position information. Both the radio signal sampling information and the position information are information that can be directly obtained in the other approaches without a need of additional collection such that positioning costs can be effectively reduced. In addition, the predictive model is obtained by means of extensive data training in the target region, has relatively strong error tolerance and error-correction capabilities, and can accurately reflect a relationship between radio signal sampling information and position information of a terminal such that a problem of positioning is inaccurate because RSS is interfered with due to multipath attenuation, non-line-of-sight blockage, and the like, and because a quantity of base stations connected to the terminal is insufficient is well avoided. Therefore, positioning is performed based on the predictive model and the radio signal sampling information of the terminal in the present disclosure such that terminal positioning accuracy can be effectively improved, and a positioning error can be reduced. This application has a high practical value.

Figure 9:
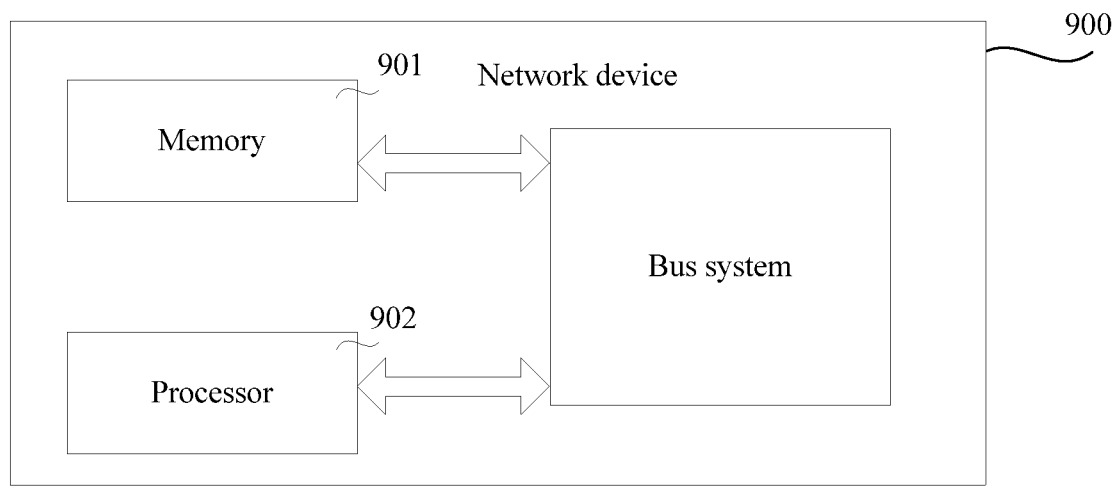
FIG. 9 is a schematic structural diagram of another network device according to this application.

Based on a same concept, FIG. 9 shows an example of a schematic structural diagram of another network device 900 according to this application. As shown in FIG. 9, the network device 900 includes a memory 901 and a processor 902.

The memory 901 is configured to store a program. Further, the program may include program code, and the program code includes a computer operation instruction. The memory 901 may be a random access memory (RAM), or may be a non-volatile memory, for example, at least one magnetic disk memory. Only one memory 901 is shown in the diagram. Certainly, a plurality of memories may be configured as required. The memory 901 may be a memory in the processor 902.

The memory 901 stores elements, such as an executable module or a data structures, or a subset thereof or an extended set thereof, an operation instruction including various operation instructions and used to implement various operations, and an operating system, including various system programs and used to implement various basic services and process hardware-based tasks.

The memory 901 further stores obtained radio signal sampling information of a first terminal at a current moment and an obtained predictive model of a target region, where the first terminal is any terminal in the target region, the target region is a preset geographic region, the predictive model is determined based on a plurality of data pairs of at least two historical terminals in the target region, each of the plurality of data pairs includes radio signal sampling information and position information, and the radio signal sampling information and the position information in the data pair are radio signal sampling information and position information of a same historical terminal at a same historical moment.

The processor 902 controls an operation of the network device 900, and the processor 902 may also be referred to as a central processing unit (CPU). In specific application, all components of the network device 900 are coupled together using a bus system. In addition to a data bus, the bus system may include a power bus, a control bus, a status signal bus, and the like. However, for clarity of description, various buses are marked as the bus system in the diagram. For ease of illustration, FIG. 9 merely shows an example of the bus system.

The methods disclosed in the foregoing embodiments of this application may be applied to the processor 902, or may be implemented by the processor 902. The processor 902 may be an integrated circuit chip, and has a signal processing capability. In an implementation process, all steps in the foregoing methods may be completed using an integrated logic circuit of hardware in the processor 902 or an instruction in a form of software. The processor 902 may be a general purpose processor, a digital signal processor (DSP), an application-specific integrated circuit (ASIC), a field programmable gate array (FPGA) or another programmable logic device, a discrete gate or transistor logic device, or a discrete hardware component, and may implement or perform the methods, the steps, and the logical block diagrams disclosed in the embodiments of this application. The general purpose processor may be a microprocessor, or the processor may be any conventional processor, or the like. The steps of the methods disclosed in the embodiments of this application may be directly executed by a hardware decoding processor, or executed by a combination of hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 901. The processor 902 reads information in the memory 901, and performs the following steps in combination with hardware of the memory 901, obtaining position information of the first terminal at the current moment by means of prediction based on the radio signal sampling information of the first terminal at the current moment and the predictive model of the target region.

Optionally, the processor 902 is further configured to obtain, by means of screening from radio signal sampling information in the plurality of data pairs, a specified radio signal feature whose relevance to a position feature in position information in the plurality of data pairs is greater than or equal to a first threshold, and establish a function relationship between the specified radio signal feature and the position feature, to obtain the predictive model.

Optionally, the processor 902 is further configured to obtain, based on at least radio signal sampling information of the to-be-positioned terminal at the current moment, a value corresponding to the specified radio signal feature, and perform calculation based on the predictive model and the value corresponding to the specified radio signal feature, to obtain position information of the to-be-positioned terminal at the current moment.

Optionally, the specified radio signal feature includes any one or any combination of a first-type signal feature, a second-type signal feature, or a third-type signal feature.

A value corresponding to the first-type signal feature is extracted from the radio signal sampling information of the to-be-positioned terminal at the current moment.

A value corresponding to the second-type signal feature is calculated based on a value corresponding to one or more first-type signal features.

A value corresponding to the third-type signal feature is obtained using initial position information of the to-be-positioned terminal at the current moment and initial position information of the to-be-positioned terminal at an adjacent moment of the current moment, and the initial position information of the to-be-positioned terminal at the current moment or the initial position information of the to-be-positioned terminal at the adjacent moment of the current moment is obtained by calculating, using the function relationship, a value corresponding to one or more first-type signal features and/or a value corresponding to one or more second-type signal features at the moment.

Optionally, the processor 902 is further configured to obtain a plurality of data pairs of any one of the at least two historical terminals based on the following method for a first historical terminal, obtaining radio signal sampling information of the first historical terminal at a plurality of first historical moments and position information of the first historical terminal at a plurality of second historical moments, where the first historical terminal is any one of the at least two historical terminals, and obtaining a plurality of data pairs of the first historical terminal based on the radio signal sampling information of the first historical terminal at the plurality of first historical moments and the position information of the first historical terminal at the plurality of second historical moments.

Optionally, the processor 902 is further configured to determine a clock correspondence between the plurality of first historical moments of the first historical terminal and the plurality of second historical moments of the first historical terminal according to a first preset rule, where the first preset rule is any one of a plurality of preset rules, calculate, for the first preset rule, a sum of distances between a base station to which the first historical terminal belongs and the first historical terminal at the plurality of first historical moments, where a distance between the base station to which the first historical terminal belongs and the first historical terminal at each of the plurality of first historical moments is obtained using the following method of determining, by the network device based on the clock correspondence, a second historical moment corresponding to the first historical moment, and determining the distance between the base station and the first historical terminal at the first historical moment based on position information of the base station in radio signal sampling information at the first historical moment and position information of the first historical terminal at the second historical moment corresponding to the first historical moment, and determine the plurality of data pairs of the first historical terminal based on a target clock correspondence, where the target clock correspondence is a clock correspondence in which the sum of distances between the base station to which the first historical terminal belongs and the first historical terminal at the plurality of first historical moments is minimum in the plurality of preset rules.

Optionally, the radio signal sampling information of the first historical terminal at the plurality of first historical moments is obtained based on first frequency, the position information of the first historical terminal at the plurality of second historical moments is obtained based on second frequency, and the first frequency is less than the second frequency.

The processor 902 is further configured to separately use the radio signal sampling information of the first historical terminal at the plurality of first historical moments as radio signal sampling information in the plurality of data pairs, and obtain, based on the target clock correspondence, the plurality of second historical moments corresponding to the plurality of first historical moments, and obtain position information in the plurality of data pairs of the first historical terminal based on at least the position information at the plurality of second historical moments corresponding to the plurality of first historical moments.

Optionally, the position information of the first historical terminal at the plurality of second historical moments includes first-type position information and/or second-type position information.

The first-type position information is position information that is obtained by parsing data collected by the network device through a Gn interface.

The second-type position information is position information that is obtained after the network device determines a moving track of the first historical terminal based on the first-type position information and map information of the target region, and performs interpolation in any two pieces of adjacent first-type position information based on the moving track.

It can be learned from the foregoing content that, in the foregoing embodiment of the present disclosure, the network device obtains the radio signal sampling information of the first terminal at the current moment. The first terminal is any terminal in the target region, and the target region is the preset geographic region. The network device obtains the position information of the first terminal at the current moment by means of prediction based on the radio signal sampling information of the first terminal at the current moment and the predictive model of the target region. In this application, the predictive model is determined based on the plurality of data pairs of the at least two historical terminals in the target region, and each of the plurality of data pairs includes the radio signal sampling information and the position information. Both the radio signal sampling information and the position information are information that can be directly obtained in the other approaches without a need of additional collection such that positioning costs can be effectively reduced. In addition, the predictive model is obtained by means of extensive data training in the target region, has relatively strong error tolerance and error-correction capabilities, and can accurately reflect a relationship between radio signal sampling information and position information of a terminal such that a problem of positioning is inaccurate because RSS is interfered with due to multipath attenuation, non-line-of-sight blockage, and the like, and because a quantity of base stations connected to the terminal is insufficient is well avoided. Therefore, positioning is performed based on the predictive model and the radio signal sampling information of the terminal in the present disclosure such that terminal positioning accuracy can be effectively improved, and a positioning error can be reduced. This application has a high practical value.

Persons skilled in the art should understand that the embodiments of the present disclosure may be provided as a method, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A terminal positioning method, comprising:
obtaining, by a network device, radio signal sampling information of a first terminal at a current moment, the first terminal being any terminal in a target region, and the target region being a preset geographic region; and
obtaining, by the network device, position information of the first terminal at the current moment by prediction based on the radio signal sampling information of the first terminal at the current moment and a predictive model of the target region, the predictive model being determined based on a plurality of data pairs of at least two historical terminals in the target region, the data pairs of any historical terminal of the at least two historical terminals being obtained based on radio signal sampling information of a historical terminal at a plurality of first historical moments and position information of the historical terminal at a plurality of second historical moments, the radio signal sampling information of the historical terminal at the first historical moments being obtained based on a first frequency, the position information of the historical terminal at the second historical moments being obtained based on a second frequency, the first frequency being less than the second frequency, each data pair of the data pairs comprising one piece of radio signal sampling information of the radio signal sampling information of the historical terminal at the first historical moments and position information, and the position information in each data pair corresponding to the one piece of radio signal sampling information of the radio signal sampling information of the historical terminal at the first historical moments.

2. The method of claim 1, wherein determining the predictive model comprises:

obtaining, by the network device by screening from radio signal sampling information in the data pairs, a specified radio signal feature whose relevance to a position feature in position information in the data pairs is greater than or equal to a first threshold; and establishing, by the network device, a function relationship between the specified radio signal feature and the position feature to obtain the predictive model.

3. The method of claim 2, wherein obtaining the position information of the first terminal at the current moment comprises:

obtaining, by the network device based on the radio signal sampling information of the first terminal at the current moment, a value corresponding to the specified radio signal feature; and performing, by the network device, calculation based on the predictive model and the value corresponding to the specified radio signal feature to obtain the position information of the first terminal at the current moment.

4. The method of claim 3, wherein the specified radio signal feature comprises any one or any combination of a first-type signal feature, a second-type signal feature, or a third-type signal feature, a value corresponding to the first-type signal feature being extracted from the radio signal sampling information of the first terminal at the current moment, a value corresponding to the second-type signal feature being calculated based on a value corresponding to one or more first-type signal features, a value corresponding to the third-type signal feature being obtained using initial position information of the first terminal at the current moment and initial position information of the first terminal at an adjacent moment of the current moment, and the initial position information of the first terminal at the current moment or the initial position information of the first terminal at the adjacent moment of the current moment being obtained by calculating, by the network device using the function relationship, a value corresponding to one or more first-type signal features or a value corresponding to one or more second-type signal features.

5. The method of claim 1, wherein the position information of the historical terminal at the second historical moments comprises first-type position information and second-type position information, the first-type position information comprising position information obtained by parsing data collected by the network device through a Gn interface, and the second-type position information comprising position information obtained after the network device determines a moving track of the historical terminal based on the first-type position information and map information of the target region, and performs interpolation in any two pieces of adjacent first-type position information based on the moving track.

6. The method of claim 1, wherein the position information of the historical terminal at the second historical moments comprises first-type position information, and the first-type position information comprising position information obtained by parsing data collected by the network device through a Gn interface.

7. The method of claim 1, wherein the position information of the historical terminal at the second historical moments comprises second-type position information, the second-type position information comprising position information obtained after the network device determines a moving track of the historical terminal based on first-type position information and map information of the target region, and performs interpolation in any two pieces of adjacent first-type position information based on the moving track, and the first-type position information comprising position information obtained by parsing data collected by the network device through a Gn interface.

8. A terminal positioning method, comprising:

obtaining, by a network device, radio signal sampling information of a historical terminal at a plurality of first historical moments and position information of the historical terminal at a plurality of second historical moments, the radio signal sampling information of the historical terminal at the first historical moments being obtained based on a first frequency, the position information of the historical terminal at the second historical moments being obtained based on a second frequency, and the first frequency being less than the second frequency; and obtaining, by the network device, a plurality of data pairs of the historical terminal based on the radio signal sampling information of the historical terminal at the first historical moments and the position information of the historical terminal at the second historical moments, each data pair of the data pairs comprising one piece of radio signal sampling information of the radio signal sampling information of the historical terminal at the first historical moments and position information, and the position information in each data pair corresponding to one piece of radio signal sampling information of the radio signal sampling information of the historical terminal at the first historical moments.

9. The method of claim 8, wherein obtaining the position information of the historical terminal at the second historical moments comprises:

obtaining, by the network device, a first-type position information of the historical terminal;

determining, by the network device, a moving track of the historical terminal based on the first-type position information and map information of a target region, the target region comprising a preset geographic region;

obtaining, by the network device, a second-type position information by performing interpolation in any two pieces of adjacent first-type position information based on the moving track; and setting, by the network device, the second-type position information as the position information of the historical terminal at the second historical moments.

10. The method of claim 9, wherein obtaining the first-type position information of the historical terminal comprises obtaining, by the network device, the first-type position information by parsing Over The Top (OTT) data collected through a Gn interface.

11. The method of claim 8, wherein obtaining the data pairs of the historical terminal comprises:

determining, by the network device, a target clock correspondence between the first historical moments and the second historical moments; and obtaining, by the network device, the data pairs of the historical terminal based on the target clock correspondence.

12. The method of claim 11, wherein determining the target clock correspondence comprises:

determining, by the network device, a clock correspondence between the first historical moments of the historical terminal and the second historical moments of the historical terminal according to a first preset rule, the first preset rule comprising any one of a plurality of preset rules;

determining, by the network device based on the clock correspondence, a second historical moment corresponding to a first historical moment;

determining, by the network device, a distance between a base station and the historical terminal at each of the first historical moments based on position information of the base station in radio signal sampling information at each of the first historical moment and position information of the historical terminal at the second historical moment corresponding to the first historical moment;

calculating, by the network device for the first preset rule, a sum of distances between the base station and the historical terminal at the first historical moments; and determining, by the network device, a clock correspondence in which the sum of distances between the base station and the historical terminal at the first historical moments is minimum in the preset rules as the target clock correspondence between the first historical moments and the second historical moments.

13. The method of claim 11, wherein obtaining the data pairs of the historical terminal comprises:

separately setting, by the network device, the radio signal sampling information of the historical terminal at the first historical moments as radio signal sampling information in the data pairs;

obtaining, by the network device based on the target clock correspondence, the second historical moments corresponding to the first historical moments; and obtaining, by the network device, position information in the data pairs of the historical terminal based on at least one of the position information at the second historical moments corresponding to the first historical moments.

14. A network device, comprising:

a memory configured to store instructions; and a processor coupled to the memory, the instructions causing the processor to be configured to:

obtain radio signal sampling information of a first terminal at a current moment and a predictive model of a target region, the first terminal being any terminal in the target region, the target region being a preset geographic region, the predictive model being determined based on a plurality of data pairs of at least two historical terminals in the target region, the data pairs of any historical terminal of the at least two historical terminals being obtained based on radio signal sampling information of a historical terminal at a plurality of first historical moments and position information of the historical terminal at a plurality of second historical moments, the radio signal sampling information of the historical terminal at the first historical moments being obtained based on a first frequency, the position information of the historical terminal at the second historical moments being obtained based on a second frequency, the first frequency being less than the second frequency, each data pair of the data pairs comprising one piece of radio signal sampling information of the radio signal sampling information of the historical terminal at the first historical moments and position information, and the position information in each data pair corresponding to the one piece of radio signal sampling information of the radio signal sampling information of the historical terminal at the first historical moments; and obtain position information of the first terminal at the current moment by prediction based on the radio signal sampling information of the first terminal at the current moment and the predictive model of the target region.

15. The network device of claim 14, wherein the instructions further cause the processor to be configured to:

obtain, by screening from radio signal sampling information in the data pairs, a specified radio signal feature whose relevance to a position feature in position information in the data pairs is greater than or equal to a first threshold; and establish a function relationship between the specified radio signal feature and the position feature to obtain the predictive model.

16. The network device of claim 15, wherein the instructions further cause the processor to be configured to:

obtain, based on the radio signal sampling information of the first terminal at the current moment, a value corresponding to the specified radio signal feature; and perform calculation based on the predictive model and the value corresponding to the specified radio signal feature to obtain the position information of the first terminal at the current moment.

17. The network device of claim 16, wherein the specified radio signal feature comprises any one or any combination of a first-type signal feature, a second-type signal feature, or a third-type signal feature, a value corresponding to the first-type signal feature being extracted from the radio signal sampling information of the first terminal at the current moment, a value corresponding to the second-type signal feature being calculated based on a value corresponding to one or more first-type signal features, a value corresponding to the third-type signal feature being obtained using initial position information of the first terminal at the current moment and initial position information of the first terminal at an adjacent moment of the current moment, and the initial position information of the first terminal at the current moment or the initial position information of the first terminal at the adjacent moment of the current moment being obtained by calculating, using the function relationship, a value corresponding to one or more first-type signal features or a value corresponding to one or more second-type signal features.

18. The network device of claim 14, wherein the position information of the historical terminal at the second historical moments comprises first-type position information and second-type position information, the first-type position information comprising position information obtained by parsing data collected by the network device through a Gn interface, and the second-type position information comprising position information obtained after the network device determines a moving track of the historical terminal based on the first-type position information and map information of the target region, and performs interpolation in any two pieces of adjacent first-type position information based on the moving track.

19. The network device of claim 14, wherein the position information of the historical terminal at the second historical moments comprises first-type position information or second-type position information, the first-type position information comprising position information obtained by parsing data collected by the network device through a Gn interface, and the second-type position information comprising position information obtained after the network device determines a moving track of the historical terminal based on the first-type position information and map information of the target region, and performs interpolation in any two pieces of adjacent first-type position information based on the moving track.

20. A network device, comprising:
   a memory configured to store computer program instructions; and
   a processor coupled to the memory, the computer program instructions causing the processor to be configured to:
      obtain radio signal sampling information of a historical terminal at a plurality of first historical moments and position information of the historical terminal at a plurality of second historical moments, the radio signal sampling information of the historical terminal at the first historical moments being obtained based on a first frequency, the position information of the historical terminal at the second historical moments being obtained based on a second frequency, and the first frequency being less than the second frequency; and
      obtain a plurality of data pairs of the historical terminal based on the radio signal sampling information of the historical terminal at the first historical moments and the position information of the historical terminal at the second historical moments, each data pair of the data pairs comprising one piece of radio signal sampling information of the radio signal sampling information of the historical terminal at the first historical moments and position information, and the position information in each data pair corresponding to one piece of radio signal sampling information of the radio signal sampling information of the historical terminal at the first historical moments.

* * * * *